United States Patent [19]

Sugiyama et al.

[11] Patent Number: 5,677,607
[45] Date of Patent: Oct. 14, 1997

[54] ENERGIZATION CONTROL SYSTEM FOR A SWITCHED RELUCTANCE MOTOR

[75] Inventors: Masanori Sugiyama, Nishio; Hisayoshi Takahashi, Kariya, both of Japan

[73] Assignee: Aisin Seiki Kabushiki Kaisha, Kariya City, Japan

[21] Appl. No.: 572,287

[22] Filed: Dec. 13, 1995

[30] Foreign Application Priority Data

Dec. 16, 1994 [JP] Japan .................................. 6-313636

[51] Int. Cl.$^6$ ........................................................ H02P 5/00
[52] U.S. Cl. .......................... 318/439; 318/701; 318/632
[58] Field of Search .................................. 318/254, 435, 318/138, 646, 685, 701, 623, 632; 310/51

[56] References Cited

U.S. PATENT DOCUMENTS

| | | | |
|---|---|---|---|
| 4,258,299 | 3/1981 | Takeda et al. | 318/138 X |
| 4,761,598 | 8/1988 | Lovrenich | 318/685 |
| 4,862,045 | 8/1989 | Gleim et al. | 318/254 |
| 5,296,787 | 3/1994 | Albrecht et al. | 318/254 X |
| 5,334,917 | 8/1994 | Lind | 318/254 |
| 5,537,020 | 7/1996 | Couture et al. | 318/254 X |

FOREIGN PATENT DOCUMENTS 1298940  1/1989  Japan .

*Primary Examiner*—Jonathan Wysocki
*Attorney, Agent, or Firm*—Sughrue, Mion, Zinn, Macpeak & Seas, PLLC

[57] ABSTRACT

The system energizes an SR motor with a current of a level which corresponds to a target rotational speed and a target torque of a rotor. The system includes an energization pattern generator which is intended to provide a smooth rotation of the rotor. The system also includes a direction of rotation detector circuit which detects an oscillation of the rotor in a peripheral direction and a compensator which corrects an energization level in synchronism with the oscillation, thereby suppressing an oscillation of the rotor in the peripheral direction. Finally, the system includes another compensator which corrects an energization level to nullify a deviation of an actual rotational speed with respect to the target rotational speed of the rotor.

15 Claims, 28 Drawing Sheets

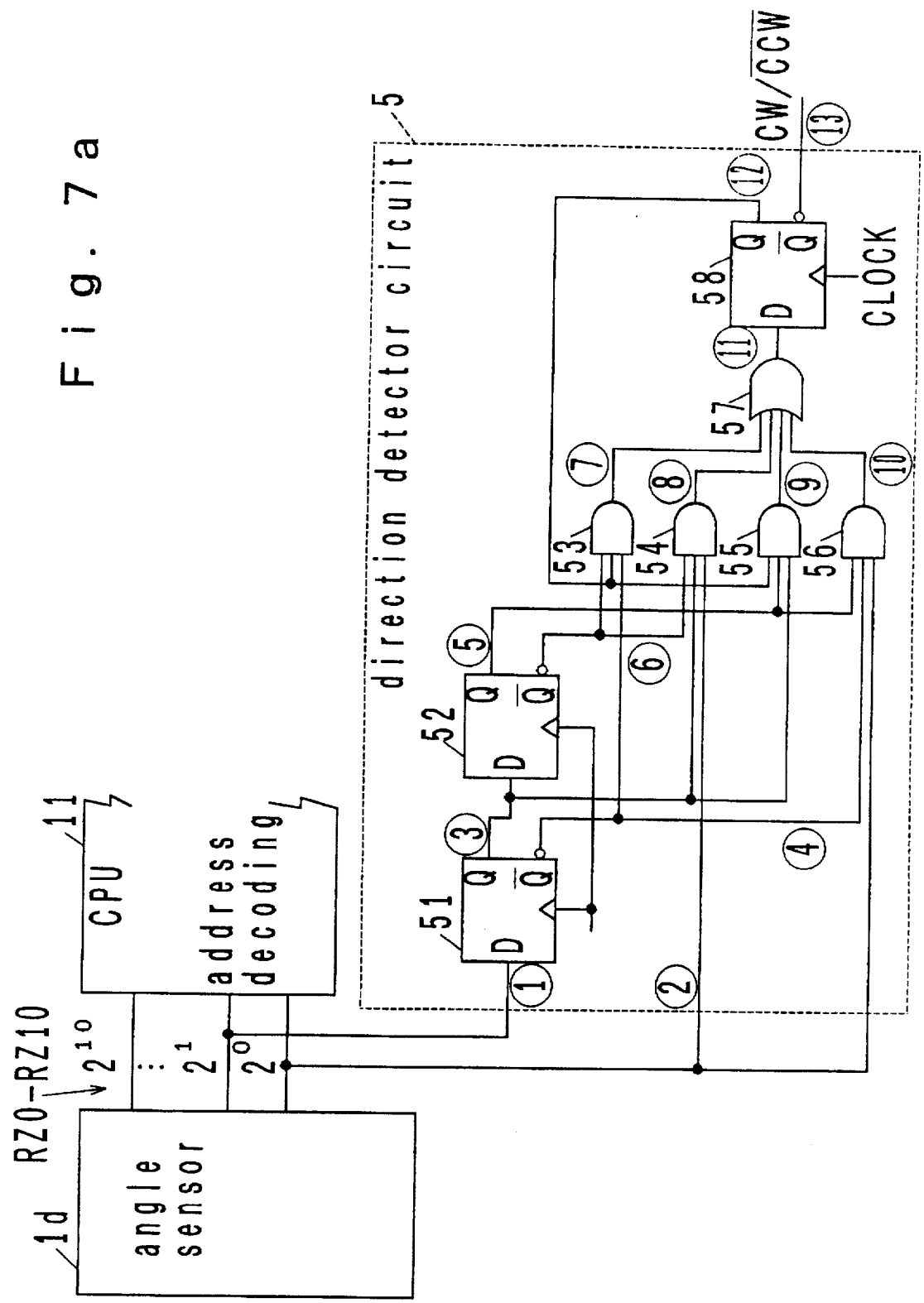

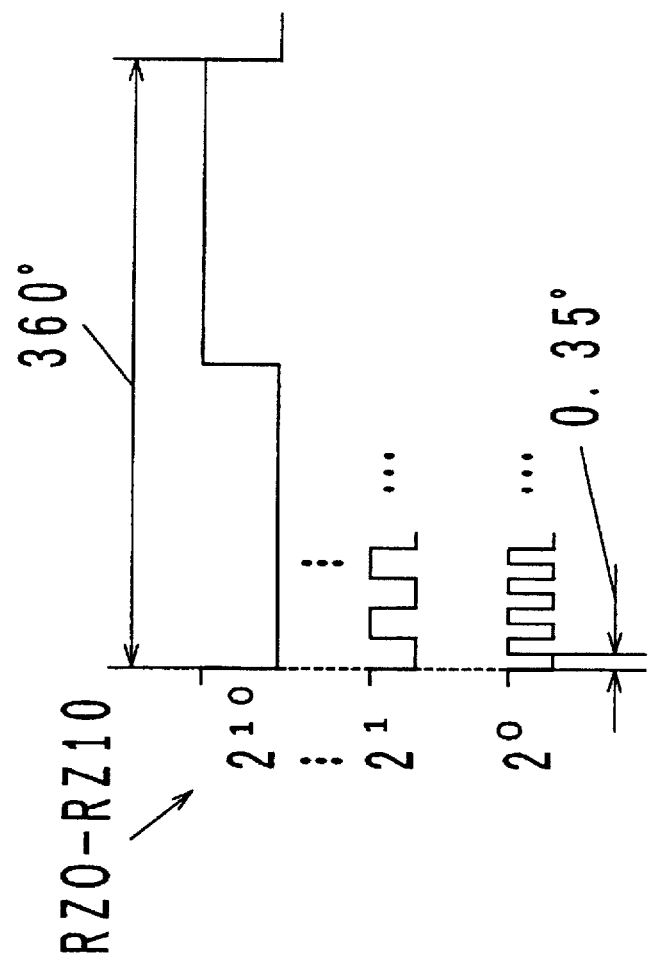

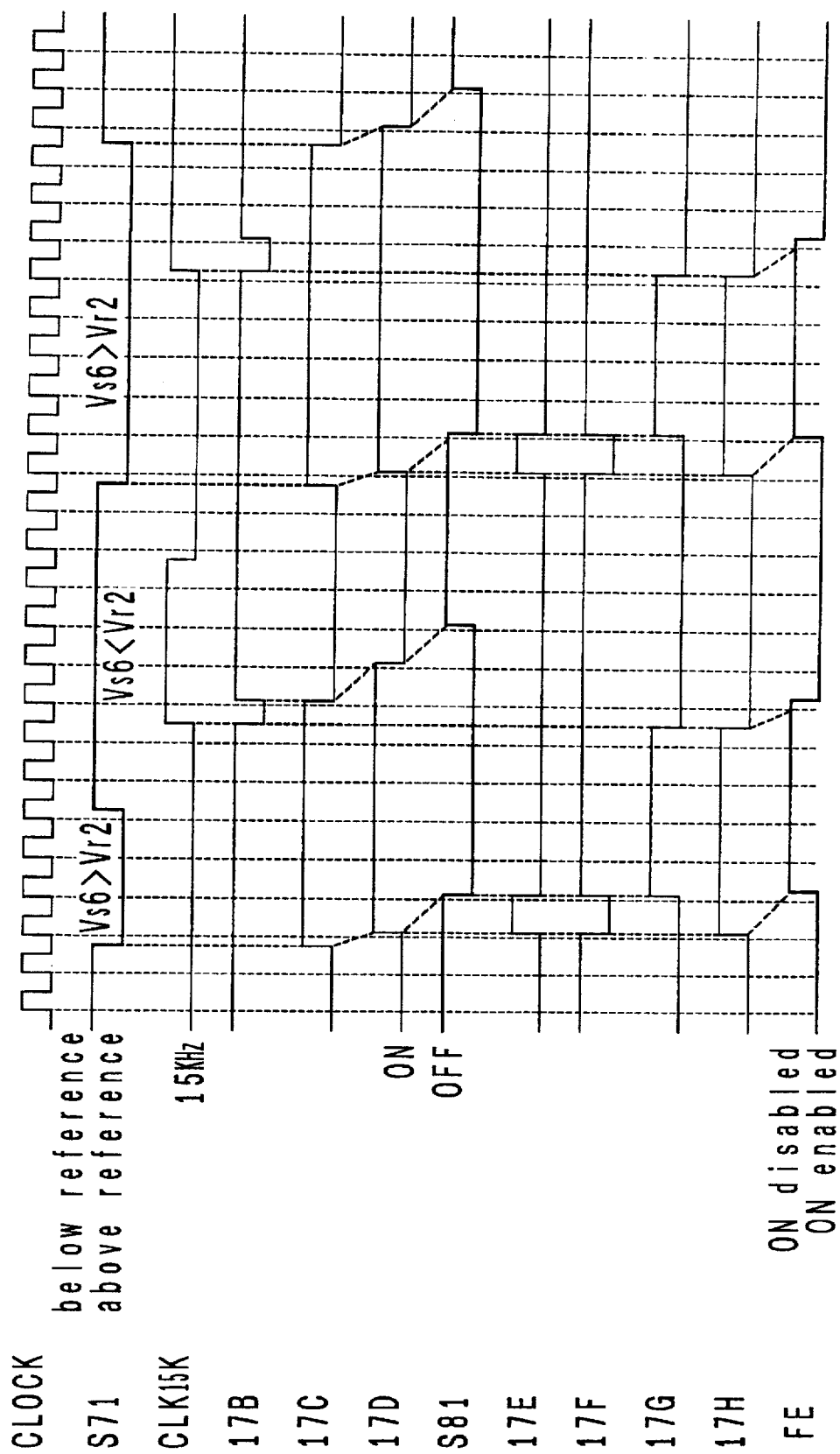

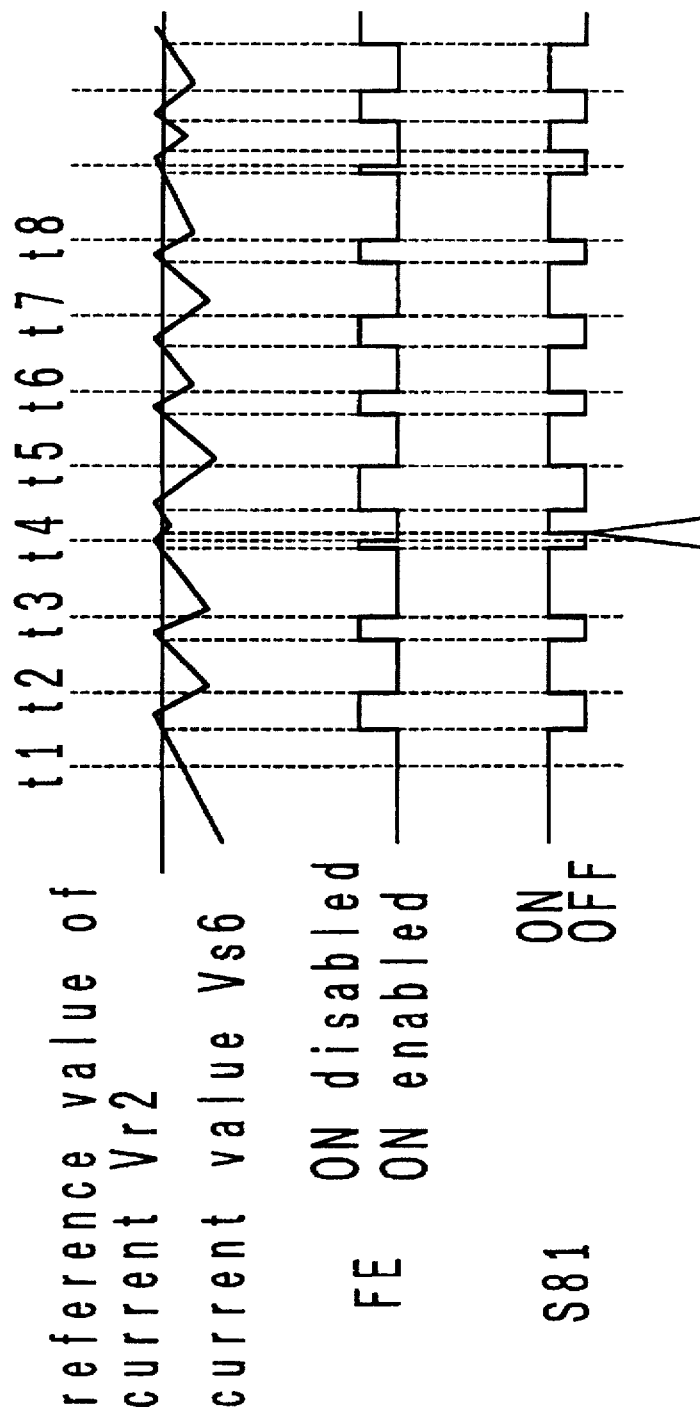

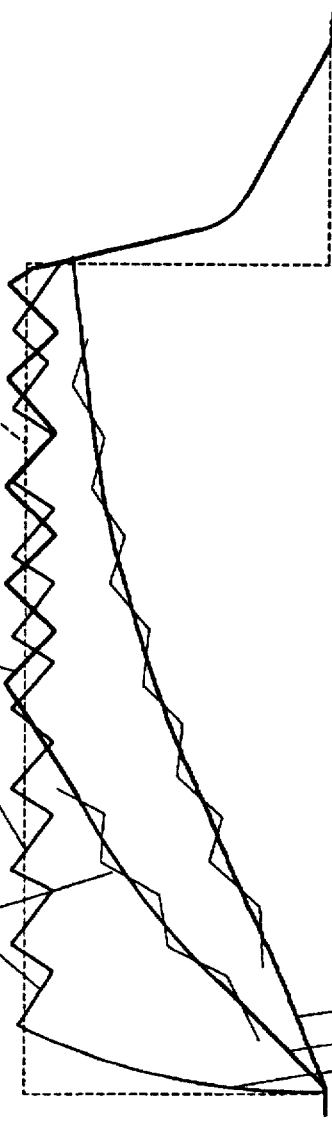

A change is rapid enough to track a rapid change in the reference. Off-current flows as indicated in Fig. 16b, producing a large potential difference and causing a rapid decay of current.

Magnitude of variation is high to cause an increased level of acoustic noise as a result of oscillation of motor.

A change occurs slowly, and cannot track a change in the reference if the rate of latter change is too fast. Off-current flows as indicated in Fig. 17b, producing a reduced potential difference and causing a slow decay of current.

Magnitude of variation is reduced, resulting in a reduced level of motor noises.

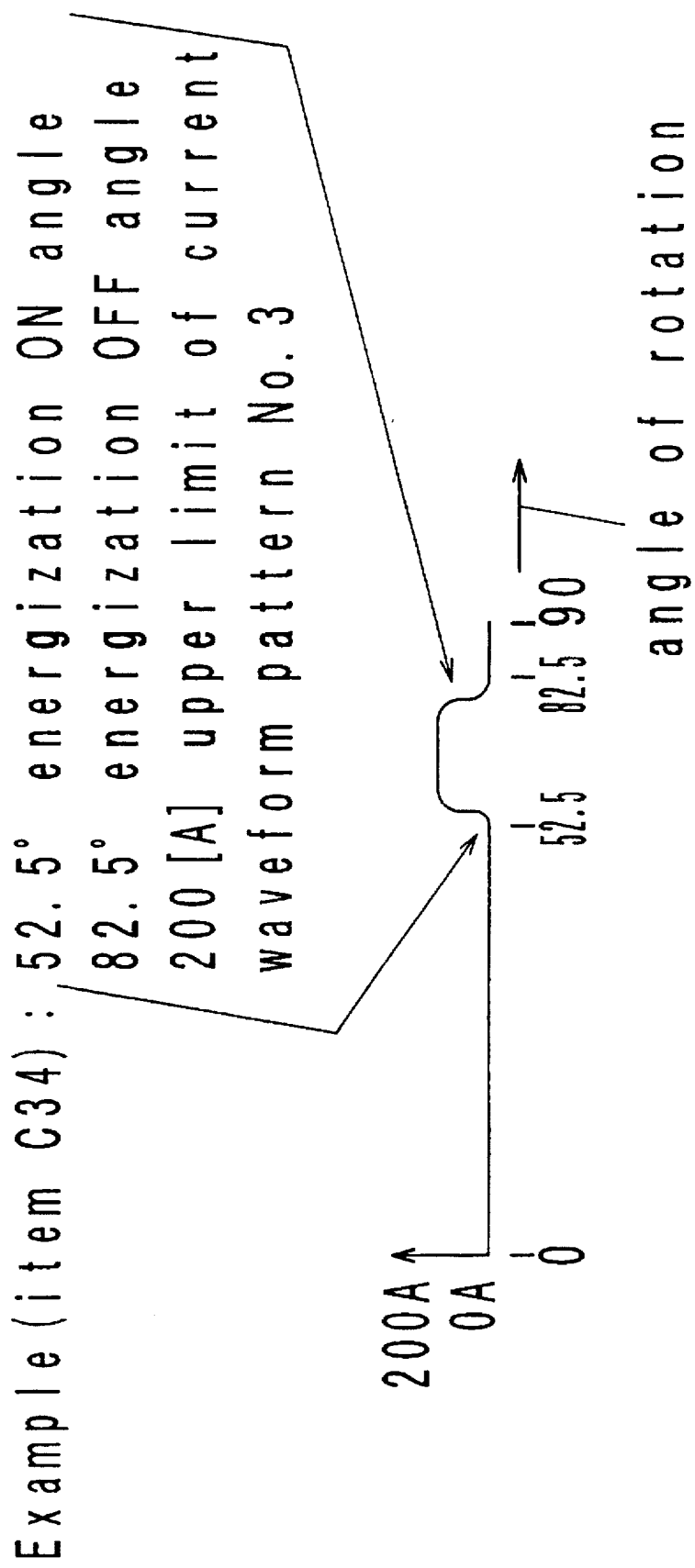

ENERGIZATION CONTROL SYSTEM FOR A SWITCHED RELUCTANCE MOTOR

FIELD OF THE INVENTION

The invention relates to an energization control of an electric motor, and in particular, to an energization control system which is suitable for use in driving an SR motor (Switched Reluctance Motor).

BACKGROUND OF THE INVENTION

A 6 pole, three-phase SR motor is schematically shown in FIGS. 18a, 18b and 18c. A rotor has four poles 1 to 4, which are not magnetized, meaning that they are not permanent magnets. A stator has six poles Sa to Sf, each of which carries an electrical coil. As shown in FIG. 18a, when electrical coils disposed on a stator pole Sa disposed close to the pole 1 on the rotor and a stator pole Sd which is diametrically opposite to the pole Sa are energized, the stator pole Sa is magnetized to an S-pole while the stator pole Sd is magnetized to an N-pole. The rotor then rotates clockwise (from the position shown in FIG. 18a to the position shown in FIG. 18b) so that the rotor pole 1 is aligned with the stator pole Sa and the rotor pole 3 is aligned with the stator pole Sd. Subsequently, as indicated in FIG. 18b, when the electrical coils disposed on the stator pole Sb, S located close to the rotor pole 2, and the stator pole Se which is diametrically opposite thereto are energized, the stator pole Sb is magnetized to an N-pole while the stator pole Se is magnetized to an S-pole, allowing the rotor to rotate clockwise (from the position shown in FIG. 18b to the position shown in FIG. 18c) so that the pole 2 is aligned with the stator pole Sb and the rotor 4 is aligned with the stator pole Se. When a pair of electrical coils which are diametrically opposite to each other with the rotor interposed therebetween are connected in series and is sequentially and selectively energized, a rotation of the rotor is achieved. Such an SR motor may be considered as a rotary solenoid. By monitoring an angle of rotation of the rotor and switching the energization of the coils in synchronism with the rotation of the rotor in the manner mentioned above, the rotor undergoes a continuous rotation. When the period with which the energization is switched is shortened, the rotational speed of the rotor may be increased. An example of SR motor is disclosed in Japanese Laid-Open Patent Application No. 298,940/1989.

An SR motor has advantages of a simple construction, a mechanical robustness and the capability of operation under an elevated temperature, but also has a number of shortcomings. One of the shortcomings relates to a high level of acoustic noises which are produced during the rotation. The cited Japanese Application points out such shortcomings of the SR motor and proposes a motor construction and an energizing circuit which are intended to compensate for such shortcomings. The disclosed circuit provides a pulse energization of a stator winding at a current level which corresponds to an output torque and the number of revolutions, and limits the energization pulse to a narrow width.

The turn-on or -off or the switching of the energization for each of the stator poles occurs in an SR motor when rotor poles assume a particular rotational position. Accordingly, the magnitude of a magnetic attraction applied to the rotor undergoes a rapid change during such switching, resulting in a mechanical oscillation of a relatively high level to the rotor and the stator, which gives rise to an acoustic noise.

To suppress such oscillation, it is necessary to provide as smooth a motor drive as possible through an energization control of the motor. When the energization is controlled in the form of a simple on/off pulse as is conventionally implemented, it is impossible to provide a smooth drive of the motor. Thus, a fine regulation of the current value must be carried out for each angle of rotation of the motor.

Such a fine regulation of the current value in accordance with the angle of rotation of the motor can be achieved by storing current values corresponding to different angles of rotation (or a current waveform obtained by plotting an energization level on the ordinate and an angle of rotation on the abscissa) in a memory, reading such current values from the memory for rotation of the motor through an incremental angle, thus sequentially changing a target value to be used in the current control. However, in the control of the kind described, a target value of the current not only depends on the angle of rotation of the motor, but it is also necessary to change such target value in accordance with the rotational speed of the motor and a driving torque required. To maintain current values, corresponding to various angles of rotation, rotational speed and driving torque of the motor, in a memory, an inhibitive memory capacity will be required. In addition, it is very difficult to maintain the current values in a memory in a manner to accommodate for any change in a speed or fluctuation in the torque which may vary from time to time.

Accordingly, to reduce the memory capacity required to maintain such current values, data stored in a memory may be limited to current values for one set of rotational positions which correspond to a selected rotational speed and a selected driving torque, and whenever a change occurs in the rotational speed or the driving torque of the motor, a calculation is implemented to rewrite the memory content. However, when such control is carried out, a time interval required for the calculation and for updating the memory data results in a very slow response of a control system. Assuming that current values for 128 steps of the angle of rotation are required, for example, for a waveform for one phase of coil, the resulting calculation and memory updating will be quite time-consuming since such calculation and updating is required for all the data corresponding to 128 steps multiplied by the number of phases each time a change occurs in the rotational speed or driving torque of the motor.

Accordingly, if a feedback control of the rotational speed is implemented, it takes time from the detection of an error between a target speed and an actual speed until a corrected value of energization level which compensates for such error can be delivered, thus reducing the tracking capability with respect to a change in a target speed during the acceleration/deceleration and also reducing the speed of response to an external disturbance.

It is also to be noted that an SR motor is very susceptible to oscillation, and accordingly it is very difficult to achieve a smooth rotation. PID control, a control based on modern control theory, vector control or the like is known in the art as a technique to provide a smooth motor drive, and an associated controller has been proposed. However, in any of such controls, the controller must perform a relatively complicated calculation, and a labor consuming tuning (decision or adjustment of gain or the like) during the design or test operation is required. It is desirable to provide a simple controller which is capable of smoothly driving a motor without substantially requiring adjusting operation.

SUMMARY OF THE INVENTION

Accordingly, a first object of the invention is to realize a relatively simple controller which provides a smooth rotation of an electric motor, and a second object is to enhance the speed of response of the motor with respect to a change in a target speed, and a third object is to suppress a variation in the rotational speed of the electric motor as a motor load fluctuates.

The inventor has found that during the rotation of an SR motor, a rotor undergoes a minute oscillation in the peripheral direction, that is, when viewed microscopically with respect to the time axis, the rotor rotates in the opposite direction from the driving direction through a minute angle though momentarily. If such reverse rotation can be suppressed, the motor operation will be more smooth, reducing the noise level. Accordingly, in accordance with the invention, the direction of rotation of the rotor is microscopically detected, and during an interval of microscopic "reverse rotation", a correction which suppresses such reverse rotation is added to a motor energization level. In this manner, the minute oscillation of the rotor in the peripheral direction is reduced. Stated differently, the driving torque of the motor is increased during the time interval when the direction of the actual rotation, which results from the minute oscillation of the rotor in the peripheral direction, is opposite to the driving direction. This effectively reduce the time interval of reverse rotation.

In a preferred embodiment of the invention, an energization map memory stores target values of the current in a manner corresponding to the angle of rotation of the rotor. An angle of rotation sensor detects an angle of rotation of the rotor, a current sensor detects a motor energization level, and a controller reads a current target value which corresponds to the detected angle of rotation from the energization map memory and changes the motor energization level in a direction so that the motor energization level detected by the current sensor matches the current target value. During the microscopic "reverse rotation" of the rotor, the controller applies a correction in order to suppress such reverse rotation. In addition, the controller changes a current target value in a manner corresponding to a change which occurred in the rotational speed of the rotor.

Other objects and features of the invention will become apparent from the following description of an embodiment with reference to the attached drawings.

BRIEF DESCRIPTION OF THE DRAWINGS

FIG. 7a is a block diagram of a direction detector circuit 5 shown in FIG. 1b;

FIG. 7b is a series of timing charts of electrical signals representing data applied from an angle sensor 1d shown in FIG. 1b to CPU 11, principally indicating a change occurring therein;

FIG. 8 is a series of timing charts indicating changes occurring in various electrical signals within the direction detector circuit 5 shown in FIG. 7a;

FIG. 10 is a series of timing charts indicating changes occurring in various electrical signals produced within the timing control circuit 17c shown in FIG. 3;

FIG. 11b is a timing chart indicating a change occurring in the signal Vs6 in a mode when an output from the timing control circuit 17c of the output decision circuit 17 shown in FIG. 2 is applied to the phase 1 driver 18 (embodiment);

FIG. 12 is a timing chart indicating a change occurring in the signal Vs6 as contrasted to a reference level Vr2 (current target value) delivered from D/A converter 6 shown in FIG. 2;

FIG. 13 is a timing chart of PWM pulse which is produced in accordance with P34, one of items contained in data (Table 1) stored in PWM map memory 13b shown in FIG. 1a;

FIG. 19 graphically shows a current flow through an electrical coil of the motor 1 shown in FIG. 1a which is produced in accordance with one item, C34, of data (Table 2) stored in the current map memory 13a shown in FIG. 1b;

FIG. 20 is a series of timing charts, illustrating a fundamental waveform of current passed through the electrical coils of the motor shown in FIG. 1a;

FIG. 21a graphically shows a current waveform formed according to data (Table 3) of pattern No. 1 stored in a waveform map memory 13c shown in FIG. 1a;

DESCRIPTION OF PREFERRED EMBODIMENT

Figure 1A:
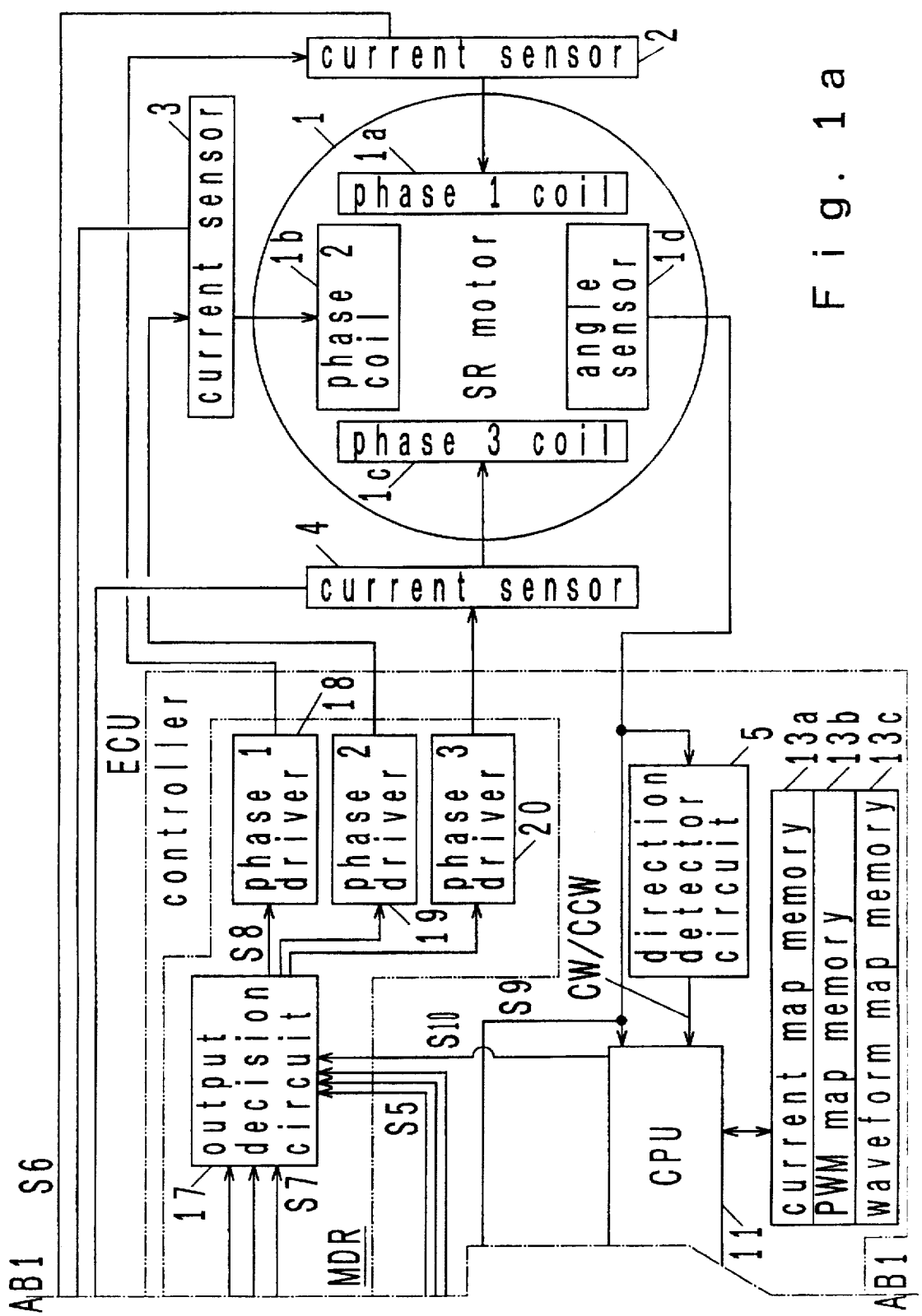
FIG. 1a is a block diagram of substantially right-half of an embodiment of the invention.
Figure 1B:
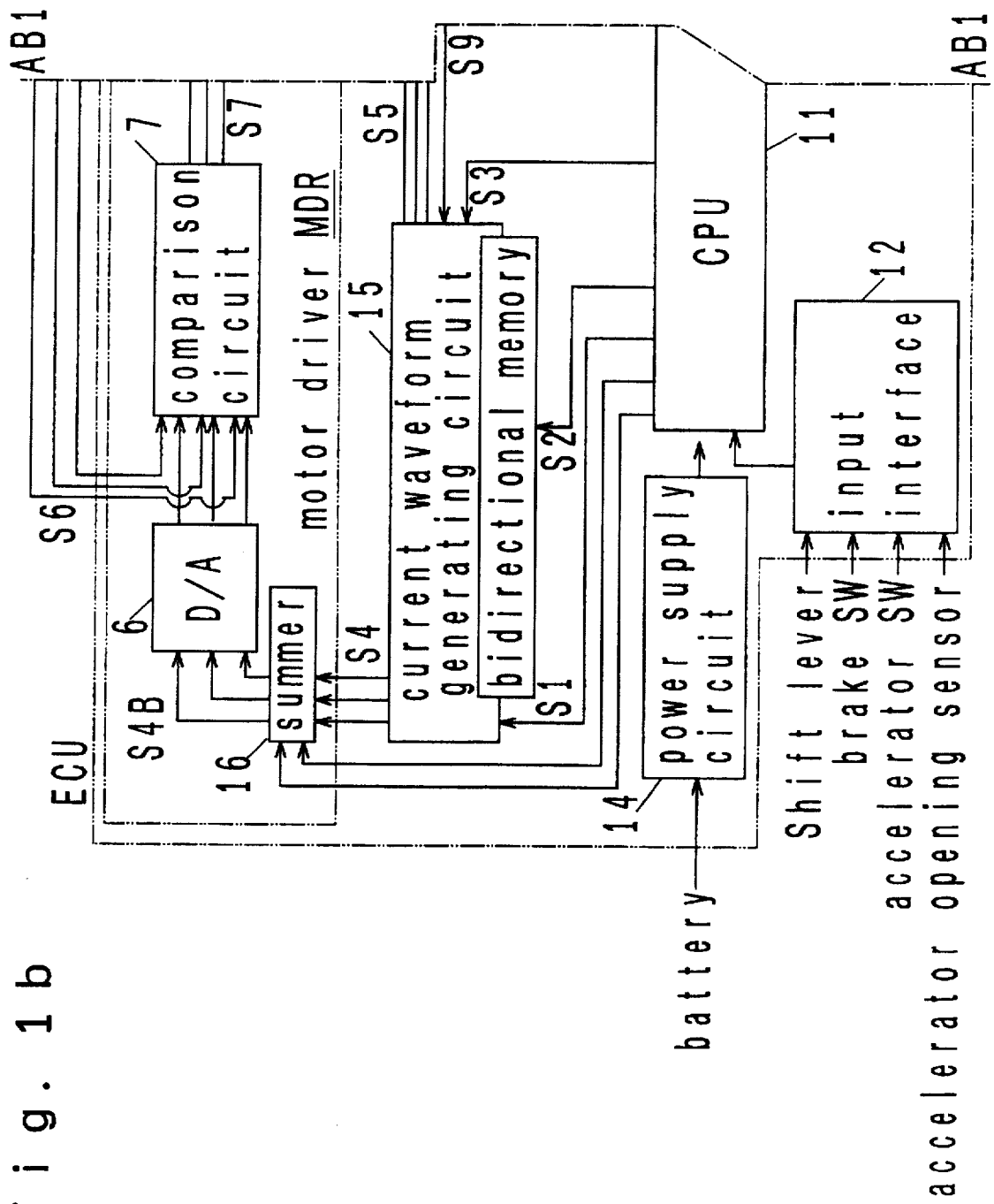
FIG. 1b is a block diagram of substantially left-half of the embodiment, FIGS. 1a and 1b being joined together along a line AB1—AB1 to represent the entire embodiment of the invention in one block diagram.

An SR motor unit comprising a combination of an SR motor 1 and a controller ECU shown in FIGS. 1a and 1b constitutes an essential portion of a drive unit for an electric car. In the example shown, a single SR motor 1 is provided as a drive source, and is controlled by the controller ECU. The controller ECU controls the driving of the SR motor 1 on the basis of information which is fed from a shift lever, a brake switch, an accelerator switch and an accelerator opening sensor. It will be seen that a storage battery is utilized as a power supply.

Figure 18A:
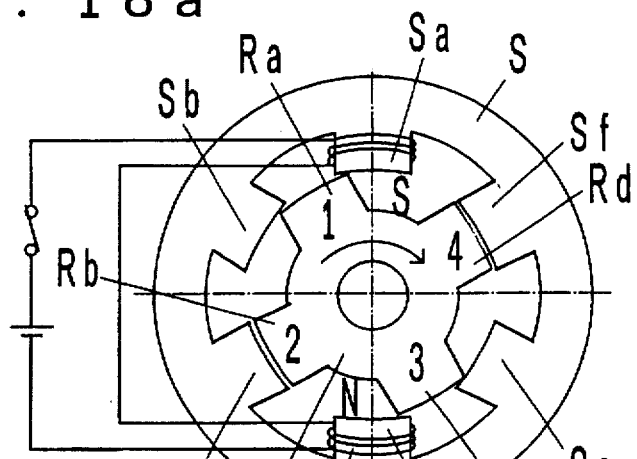
FIG. 18a is a front view showing a basic structure of an SR motor, illustrating the motor at the commencement of energization of phase 1 coil.
Figure 18B:
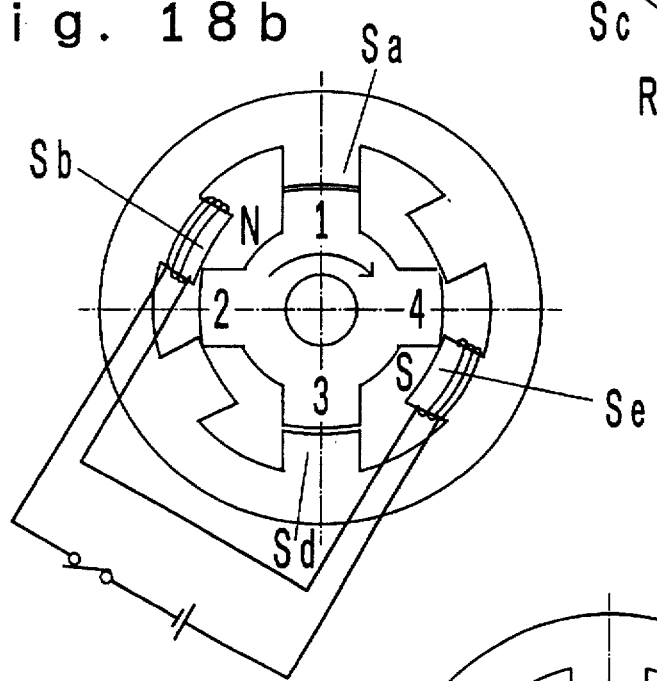
FIG. 18b is a similar view as FIG. 18a, illustrating the motor at the commencement of energization of phase 2 coil.
Figure 18C:
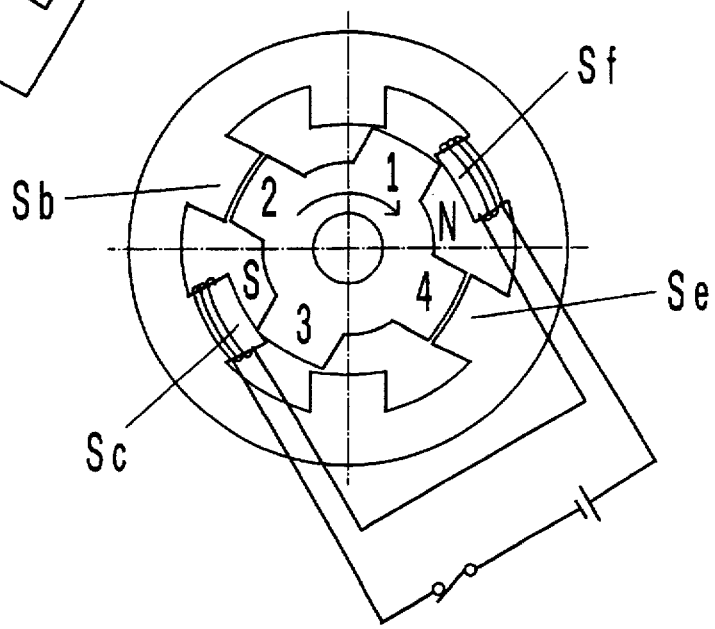
FIG. 18c is a similar view to FIG. 18a, illustrating the motor at the commencement of energization of phase 3 coil.

The basic construction and the principle of driving of the SR motor 1 are illustrated in FIGS. 18a to 18c. The motor 1 shown in FIG. 18a comprises a stator S, and a rotor R which is rotatably supported within the internal space of the stator. The rotor R comprises a lamination of a number of thin iron sheets, and is formed with outwardly projecting four poles Ra, Rb, Rc and Rd at locations which are spaced apart by 90° around its outer periphery. The stator S also comprises a lamination of a number of thin iron sheets, and is formed with inwardly projecting six poles Sa, Sb, Sc, Sd, Se and Sf at locations which are spaced apart by 60° around its inner periphery. While only partly shown in FIG. 18a, each pole Sa to Sf of the stator S has an electrical coil CL disposed thereon.

Here, we define a coil CL disposed on the poles Sa, Sb in the stator S as phase 1 (and denoted by reference character 1a in FIG. 1a), a coil CL on the poles Sb, Se as phase 2 (denoted by reference character 1b), and a coil disposed on the poles Sc, Sf as phase S (and denoted by reference character 1c). Then, by sequentially energizing the coils CL in the sequence of phase 1—phase 2—phase 3 depending on the position of the poles on the rotor R as illustrated in FIGS. 18a, 18b and 18c, it is possible to drive the rotor R for continuous rotation in the clockwise direction. Thus, a pole on the stator S which is energized constitutes an electromagnet, and accordingly a pole on the rotor R which is located close to the electromagnet is attracted thereby for rotational movement. To continue such rotation, it is necessary to switch the energization of the coils as the rotational movement of the rotor R proceeds. In actuality, for the SR motor 1, the coils which are energized may be switched in the sequence of phase 1—phase 2—phase 3 as the rotor R rotates through 30°.

Referring to FIG. 1a, the SR motor 1 is provided with three phase coils 1a, 1b, 1c which are used for driving purpose, and an angle sensor 1d which detects a rotational position or angle of rotation of the rotor R. The three phase coils 1a, 1b and 1c are connected to respective phase drivers 18, 19 and 20, respectively, which are contained in a motor driver MDR within the controller ECU. Current sensors 2, 3 and 4 are connected in a signal line joining the coil 1a and the driver 18, a signal line joining the coil 1b and the driver 19, and a signal line joining the coil 1c and the driver 20. Each of these current sensors 2, 3 and 4 delivers a current signal S6 in the form of a voltage which is proportional to an actual current flow through each of the coils 1a, 1b and 1c. In the present embodiment, the angle sensor 1d used is TS2028N94E21 manufactured by Tamagawa Seiki. The angle sensor 1d delivers a binary signal having 11 bits representing an absolute value of an angle from 0° to 360°, as shown in FIG. 7. The resolution of an angle detected is 0.35°. Thus, one unit of detected angle data is 0.35°.

The controller ECU contains CPU (microcomputer) 11, an input interface 12, a current map memory 13a, PWM map memory 13b, a waveform map memory 13c, a power supply circuit 14, a current waveform generating circuit 15, a summer 16, a direction detector circuit 5, D/A converter 6, a comparison circuit 7, an output decision circuit 17, and drivers 18, 19 and 20. On the basis of information which are fed from a shift lever, a brake switch, an accelerator switch and an accelerator opening sensor, the controller ECU sequentially calculates a driving speed and a driving torque of the SR motor 1, and controls the magnitude of current passed through each of the coils 1a, 1b and 1c of the motor 1 based on the results of such calculation.

Figure 2:
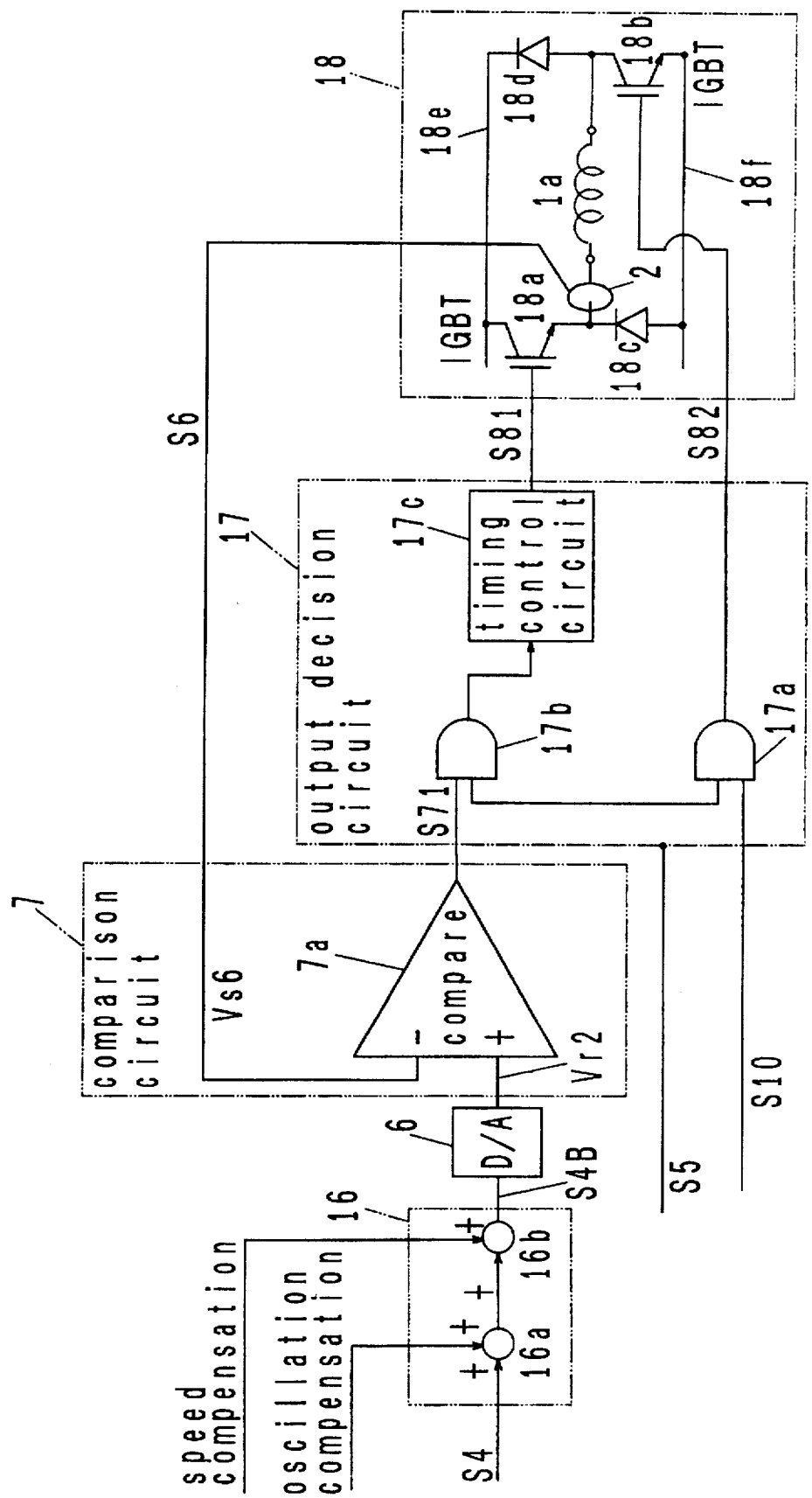
FIG. 2 is a circuit diagram showing a summer 16, a comparison circuit 7, an output decision circuit 17 and a first phase driver 18 shown in FIGS. 1a and 1b.

FIG. 2 specifically shows part of the circuit shown in FIGS. 1a and 1b. It is to be noted that FIG. 2 shows only the circuit which controls the energization of phase 1 coil 1a, but that in actuality, similar circuits for controlling the energization of phase 2 and phase 3 coils 1b and 1c are also provided.

Referring to FIG. 2, phase 1 coil 1a has its one end connected through a switching transistor IGBT (18a) to a high potential line 18e of a power supply while the other end of the coil 1a is connected through a switching transistor IGBT (18b) to a low potential line 18f of the power supply. A diode 18c is connected across the emitter of the transistor 18a and the line 18f while a diode 18d is connected between the collector of the transistor 18b and the line 18e. Accordingly, when the transistors 18a and 18b are both turned on, a current flow is established across the lines 18e, 18f through the coil 1a. If either one or both of the transistors are turned off, the energization of the coil 1a can be interrupted.

The output decision circuit 17 includes a pair of AND gates 17a, 17b and a timing control circuit 17c. An output terminal of the gate 17a is connected to the gate of the transistor 18b while an output terminal of the gate 17b is connected to an input of the timing control circuit 17c. An output of the timing control circuit 17c is connected to the gate of the transistor 18a. Signals S10 and S5 are fed to the input terminals of the gate 17a while signals S71 and S5 are fed to the input terminals of the gate 17b. Signal S71 is a binary signal delivered by an analog comparator 7a contained in the comparison circuit 7. Signal S5 is a binary signal (on/off signal) delivered by the current waveform generating circuit 15.

An analog voltage Vr2, representing a sum of a reference current value S4 delivered from the circuit 15, an oscillation compensating value and a speed compensating value, which are summed in the summer 16, and converted by D/A converter 6, is applied to one of input terminals of the analog comparator 7a while a voltage (Vs6) of a signal S6 which corresponds to the current detected by the current sensor 2 is applied to the other input terminal. The analog comparator 7a delivers a result of comparison between the voltages Vr2 and Vs6 as a binary signal (pulse signal) S71.

When the signal S5 is at a high level H (enabling energization), the turn-on/-off of the transistor 18a is controlled in accordance with the binary signal S71 delivered from the analog comparator 7a. However, it is to be noted that the turn-on/-off of the binary signal S71 is not in a one-two-one correspondence with respect to the turn-on/-off of the transistor 18a, but that the timing is adjusted by the timing control circuit 17c, as will be further described later. When the signal S5 is at its high level H, the transistor 18b in the driver 18 is turned on or off in accordance with the binary signal S10 fed to the gate 17a. The binary signal S10 is produced within CPU 11, having a fixed period (15 kHz) and a variable duty cycle, which is modified as required by CPU 11. Actually, CPU 11 delivers the binary signal S10 having a value of duty cycle, by accessing Table 1 contained in the PWM map memory 13b to read data thereof on the basis of the prevailing number of revolutions (rpm) and the required driving torque of the motor.

Thus, in this embodiment, the transistors 18a and 18b are independently turned on or off in accordance with the control signals S81 and S82 which are independent from each other, so that the driver 18 has three states, namely, when transistors 18a, 18b are both on, when they are both off, and when one of them is on while the other is off.

For example, when commencing the energization, assuming that the transistor 18b is on, as the current reference level Vr2 is changed from 0 to Iref, it follows that Vr2>Vs6. Accordingly, the transistor 18a is initially turned on, and the current flow through the coil 1a gradually increases from 0 with a slope which is determined by the characteristics or time constants of the drive circuit and the load. As the current passing through the load reaches Iref, the transistor 18a is repeatedly turned off and on, thus controlling the maximum value of the current so that it remains substantially equal to Iref. When the energization is to be terminated, as the reference current value is changed from Iref to 0 it follows that Vr2<Vs6. Accordingly, the transistor 18a is turned off, and the current flow through the coil 1a gradually decreases with the slope which is determined by the characteristics of the driving circuit and the load until it reaches 0.

However, in practice, since the control signal S82 applied to the transistor 18b is a pulse signal, there exists a time interval during which the transistor 18b is off even during the rising interval at the commencement of the energization, whereby the coil current rising curve is influenced accordingly. Specifically, FIG. 12 shows a change in the coil current rising curve which occurs in accordance with the duty cycle of the control signal S82 applied to the transistor 18b. During the falling interval at the termination of the energization, there exists a time interval during which the transistor 18b is off and the time interval during which the transistor 18b is on, and hence the falling curve of the coil current changes in accordance with the ratio of these intervals.

Figure 16A:
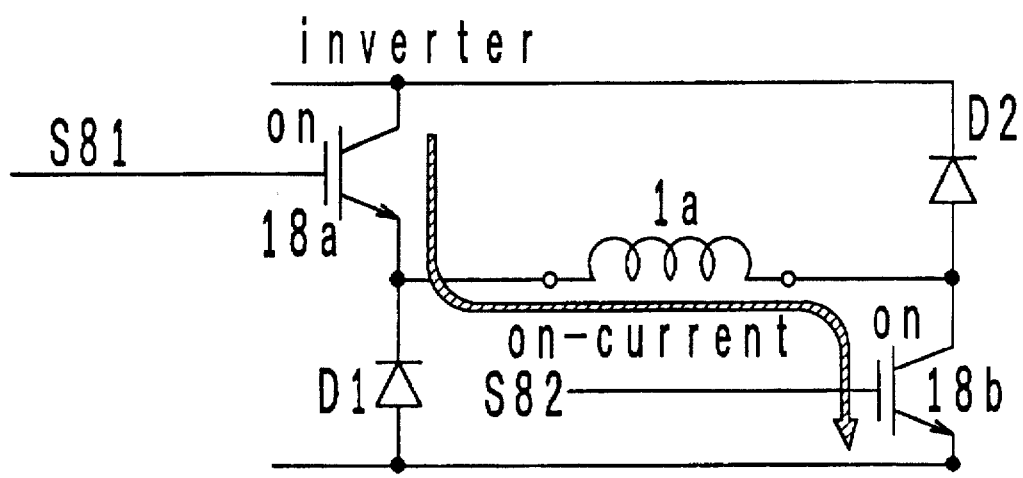
FIG. 16a is a circuit diagram showing the direction of current flow through phase 1 driver 18 when the output decision circuit 17 shown in FIG. 2 delivers signals S81, S82, representing the energization command level to the phase 1 driver 18.
Figure 16B:
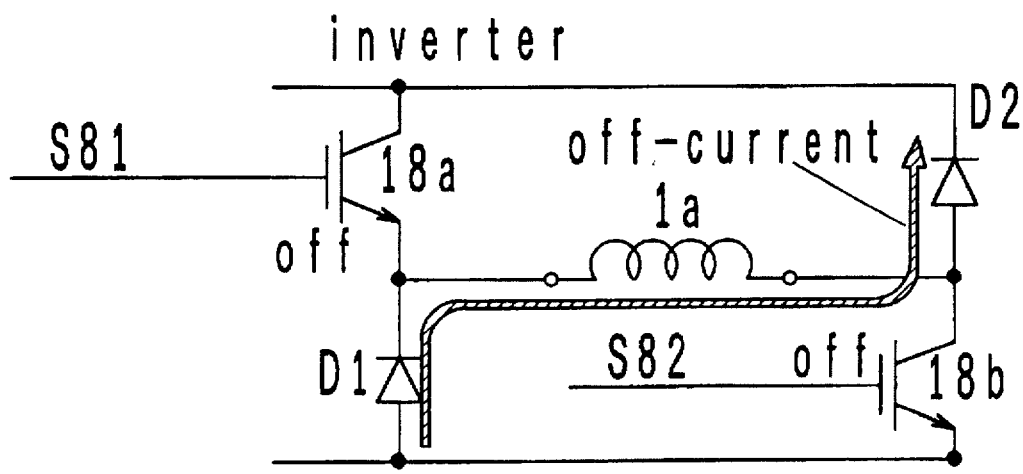
FIG. 16b is a similar circuit diagram showing the direction of current flow through the phase 1 driver 18 immediately after the output decision circuit 17 has switched the signals S81, S82 to the phase 1 driver 18 to deenergization command level.

This will be described in further detail with reference to FIGS. 16a to 16c and 17a to 17c. When the transistors 18a and 18b are both turned on to pass a current through the coil 1a as shown in FIG. 16a, if the both transistors 18a, 18b are turned off as shown in FIG. 16b, the energy stored in the coil 1a causes a current flow through diodes D1, D2 from the low potential line to the high potential line of the power supply. At this time, there is a large potential difference across the opposite ends of the coil 1a, whereby the energy is released rapidly, accelerating the rate at which the current decays. Accordingly, the falling slope of the transient current curve is steep, as indicated in FIG. 16c.

Figure 17A:
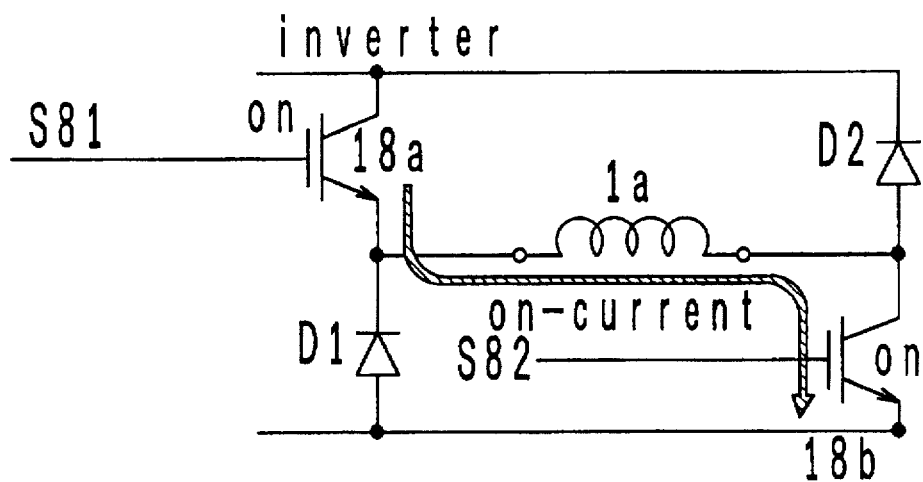
FIG. 17a is a circuit diagram indicating the direction of current flow through the phase 1 driver 18 when the decision circuit 17 applies energization command level signals S81, S82 to the driver 18.
Figure 17B:
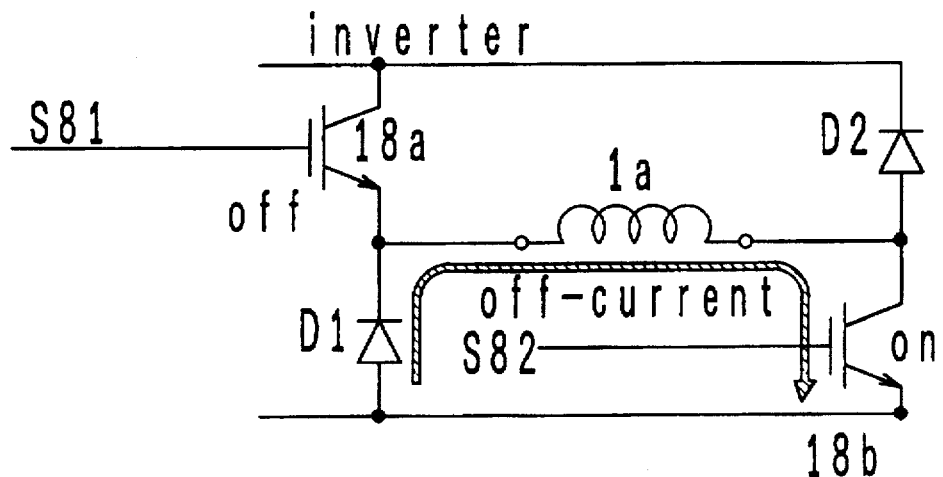
FIG. 17b is a similar circuit diagram indicating the direction of current flow through the phase 1 driver 18 which occurs immediately after the decision circuit 17 has switched only one, S81, of the signals S81, S82 to the phase 1 driver 18 to the deenergization command level.

On the other hand, when the transistors 18a, 18b are both turned on to pass a current through phase 1 coil 1a as shown in FIG. 17a, and then only one of the transistors, 18a, is turned off as indicated in FIG. 17b, the presence of the other transistor 18b which remains on causes a current flow which results from the energy stored in the coil 1a to pass through a closed loop including diode D1, coil 1a and transistor 18b. At this time, a potential difference across the ends of the coil 1a is reduced, and hence the release of energy takes place in a gentle manner, and the rate at which the current decays is slow. Accordingly, the falling slope of the transient current curve is reduced as shown in FIG. 17c.

In this manner, by adjusting the duty cycle of the control signal S82 applied to the transistor 18b, it is possible to control the rising and the falling waveform of the coil current.

Figure 16C:
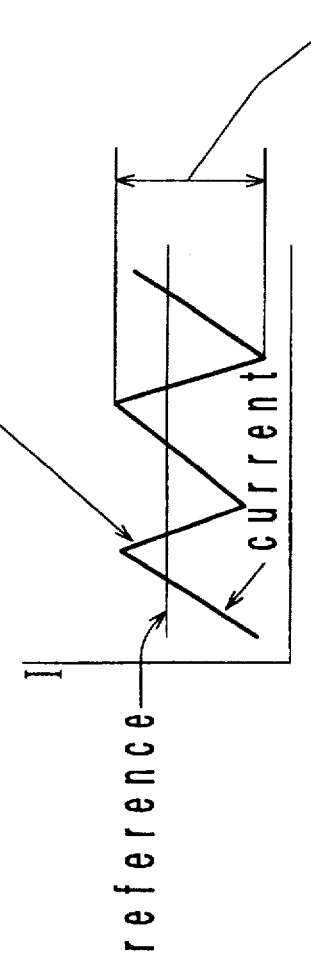
FIG. 16c graphically shows a change in the current flow through the electrical coil of the motor when the energization shown in FIG. 16a and the deenergization shown in FIG. 16b are alternately repeated.
Figure 17C:
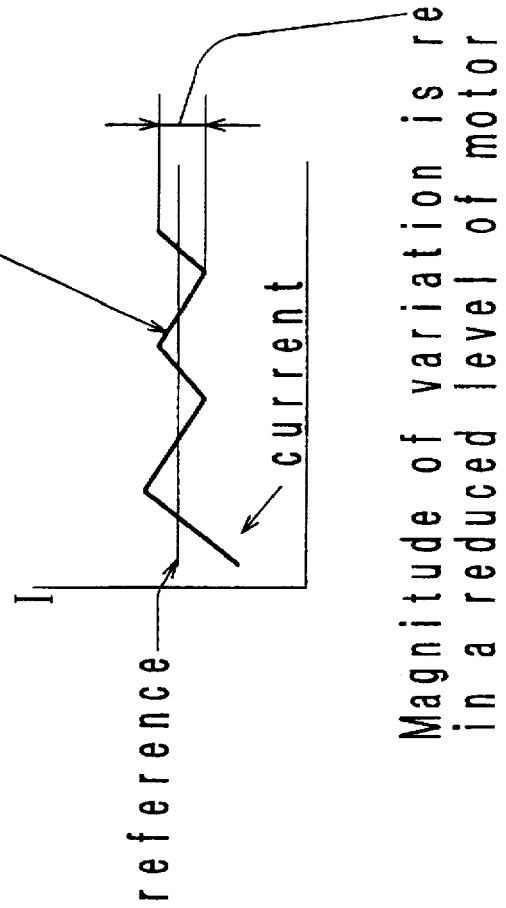
FIG. 17c graphically shows a change occurring in the current through the electrical coil of the motor when the energization shown in FIG. 17a and the deenergization shown in FIG. 17b are alternately repeated.

When a chopping control is carried out in accordance with the binary signal S71 delivered from the comparator 7a, there results an increased magnitude of variation in the current as shown in FIG. 16c when the falling rate of the coil current is relatively fast, and a reduced magnitude of variation in the current as shown in FIG. 17c if the falling rate of the current is relatively slow. By reducing the magnitude of variation in the current, mechanical oscillation and acoustical noises which occur during the rotation of the SR motor can be drastically reduced.

However, a slow falling rate of the current is likely to cause a tracking lag of the current with respect to a target value when a target value (reference level) of the chopping control is changed. It is necessary to change the current level used with the motor as a driving torque is changed. In particular, when the SR motor is driven, it is necessary to switch the energization/deenergization of each coil in accordance with the position of poles on the rotor (or angle of rotation), and hence if a tracking lag of the current with respect to the target value occurs, a reduction in the rotating torque will be remarkable, in particular, when the motor is rotating at a high speed.

In the present embodiment, the duty cycle of the signal S10 is automatically adjusted on the basis of the number of revolutions (rpm) and the required driving torque of the motor. Accordingly, when the number of revolutions is high or when an increased driving torque is required, the rising rate of energization is accelerated, thus preventing a tracking lag the current with respect to a change in the target value from occurring. On the other hand, when the number of revolutions is low or when an increased driving torque is not required, the rising or falling rate of the coil current is slow, whereby the generation of mechanical oscillation and acoustical noises is suppressed. While it is difficult to provide a fine adjustment of the waveform of the current reference level (Vr2) in a reduced time interval, it is a simple matter to adjust the duty cycle of the signal S10.

The transistor 18a normally repeats a turn-on and turn-off with a short period in accordance with the result of comparison determined by the comparator 7a. However, if the signal S71 delivered from the comparator 7a is directly applied to the transistor 18a, the on/off interval of the transistor 18a will be governed by the characteristics of the energization circuit including the transistor 18a, the impedance of the coil 1a or the like, and thus is subject to the influences of an environmental change such as temperature or humidity. In some instance, the on/off frequency of the transistor 18a may become abnormally high. When the frequency with which the energization is turned on and off increases, there results an increased loss in the transistor 18a, and hence in the heating value thereof. Conversely, when the frequency with which the energization is turned on and off is lower than the upper limit of the audible frequencies to a human being, mechanical oscillation which results from the switching of the current is audible as noises. Accordingly, it is desirable to control the on/off frequency of the transistor 18a so that it be slightly higher than the upper limit of audible frequencies to the human being (for example, 15 kHz).

Figure 11A:
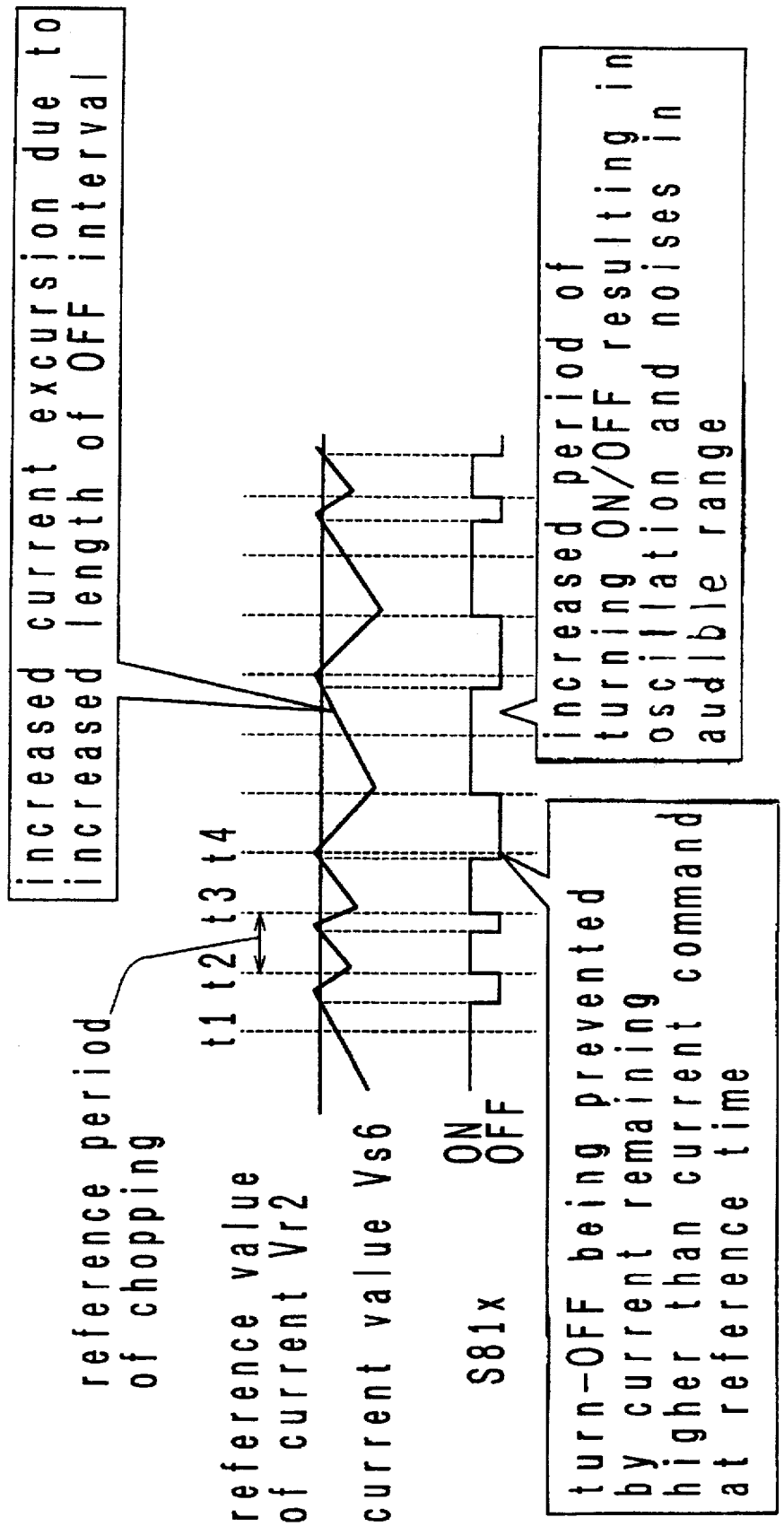
FIG. 11a is a timing chart indicating a change occurring in a signal Vs6 representing a current passing through an electrical coil 1a of the motor 1 within the output decision circuit 17 shown in FIG. 2 in a mode in which the timing control circuit 17c is eliminated and an output from AND gate 17b is applied to phase 1 driver 18 (such mode being utilized as a control)

In order to control the on/off frequency of the transistor 18a, the control shown in FIG. 11a has been constructed before making a mock-up according to the embodiment. Referring to this Figure, a sync signal having a fixed period is used to define timings t1, t2, t3, - - - , and a signal S81x applied to the transistor 18a is turned off each time the inequality Vr2<Vs6 applies. If Vr2>Vs6 at each of timings t1, t2, t3, - - - , the signal S81x is switched on. However, if Vr2≦Vs6, the signal S81x is maintained off. With this control (used for purpose of comparison), when the inequality Vr2<Vs6 is established immediately before the timing (t4) of the sync signal, the signal S81x is maintained off because the inequality Vr2<Vs6 applies at the timing t4, with consequence that the signal S81x remains on or off over a prolonged period of time without experiencing a switching therebetween. This resulted in an occurrence that the on/off frequency of the transistor 18a becomes lower than the upper limit of the audible frequency to the human being.

To take this into consideration, in the present embodiment, an improved timing control circuit 17c is employed to effect a control as illustrated in FIG. 11b. Specifically, a sync signal having a fixed period is used to define timings t1, t2, t3, - - - . A signal FE is switched to a high level H (disabling "on") whenever the inequality Vs6>Vr2 applies and is switched to a low level L (enabling "on") at each of the timings t1, t2, t3, - - - of the sync signal. The requirement to turn the signal S81 off is that the inequality Vs6>Vr2 applies, and the requirement to turn the signal S81 on is that the signal FE enables "on" and Vs6≦Vr2. With such control of the embodiment, if Vr2<Vs6 immediately before the timing (t4) of the sync signal and Vr2<Vs6 immediately thereafter or at the timing (t4) of the sync signal, the signal S81 is switched on if Vs6>Vr2 applies after the signal FE is switched to enable "on". Accordingly, the on/off period of the signal S81 will be substantially equal to the period of the sync signal or the reference chopping period, preventing any significant change in the frequency. Accordingly, by choosing the frequency of the sync signal slightly higher than the upper limit of the audible frequencies to the human being, the generation of noises of audible frequencies can be prevented while preventing the occurrence of significant heating.

Figure 3:
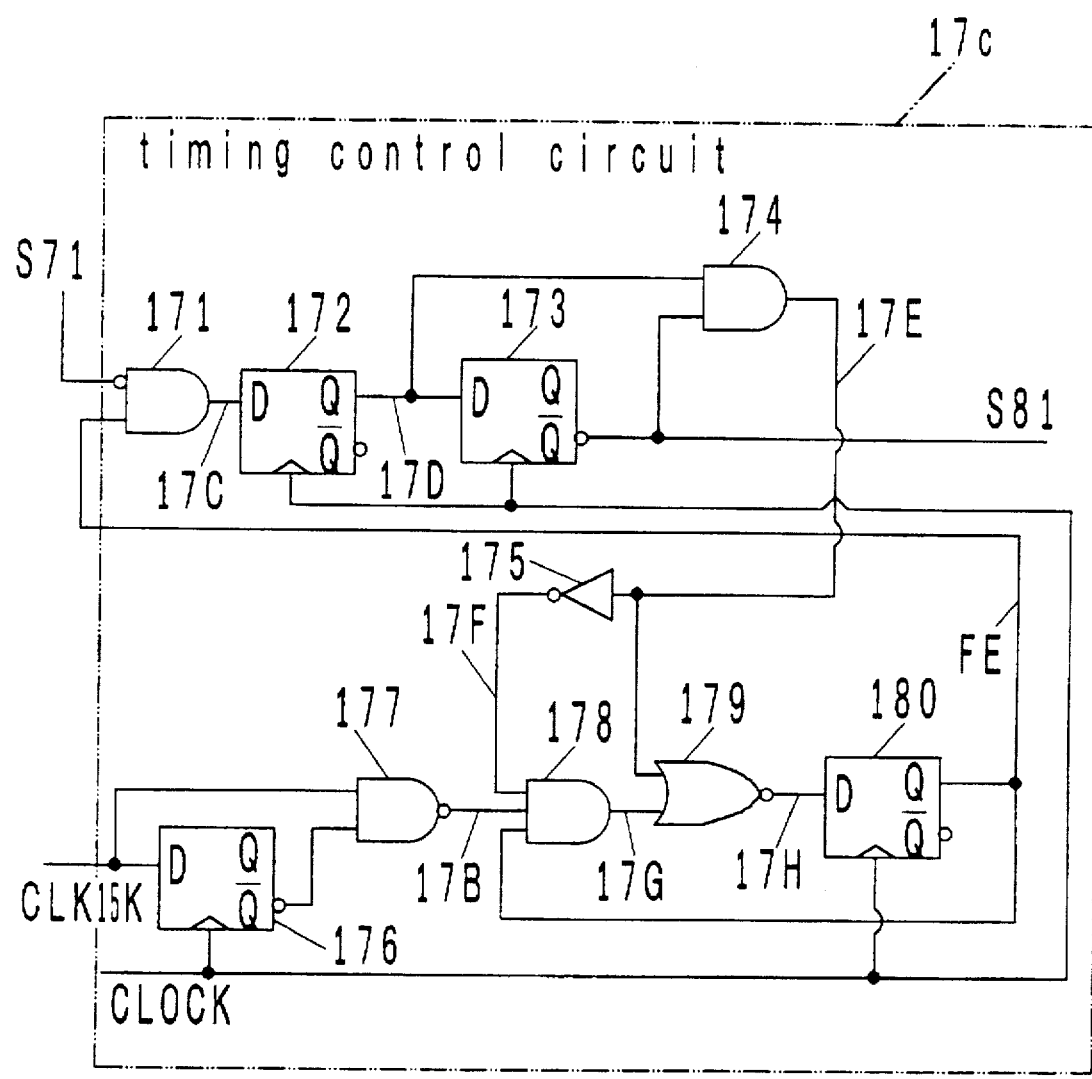
FIG. 3 is a circuit diagram of a timing control circuit 17c shown in FIG. 2.

The arrangement of the timing control circuit 17c is specifically shown in FIG. 3, and waveforms of various signals appearing in the circuit are shown in FIG. 10. In this embodiment, a sync signal CLK15K comprises a pulse signal having a frequency of 15 kHz. The circuit shown in FIG. 3 comprises gate circuits 171, 174, 177, 178 and 179; D-type flipflops 172, 173, 176 and 180; and an inverter 175. As shown in FIG. 10, the signal FE is switched to 'disable "on"' whenever the input signal S71 satisfies Vs6>Vr2, and switched to 'enable "on"' at the timing of the rising edge of the sync signal CLK15K of 15 kHz. The signal S81 is switched off when the input signal S71 satisfies Vs6>Vr2, and is switched on after the 'disable "on"' of the signal FE is terminated and when the input signal S71 satisfies Vs6<Vr2. Accordingly, using the timing control circuit 17c, a conduction command signal S81 having a period equal to or less than a given value, as shown in FIG. 11b, is applied to phase 1 driver 18.

In order to enable the rotational speed of the motor 1 to track a target speed accurately, it is desirable to implement a feedback control of the speed⁻. In the present embodiment, the current value supplied to the motor 1 is controlled by controlling the current reference level Vr2 which is fed to the comparator 7a⁻. However, to enable a minute current waveform to be controlled, a current value (reference level Vr2) corresponding to an angle is determined for every minute or incremental angle of rotation (0.7°, namely, twice the unit 0.35° of detected angle data) of the motor 1. Hence, if the energization of the motor is adjusted as the number of revolutions (rpm) or required torque is changed, current values for all the angles must be calculated for each phase coil, and these values must be used to update the memory. Thus, an updating of controlled variables is very time consuming, which retards the response of the control system. If a speed feedback control is included into the control system which adjusts such number of current values (namely, current waveform generating circuit 15), a rapid response to any change in the speed cannot be expected. Accordingly, in the present embodiment, a separate speed feedback control is implemented independently from a current waveform generating system. Thus, referring to FIG. 2, a speed compensation value produced by the speed feedback control is added to the output signal S4 from the current waveform generating circuit 15 in the summer 16. Since the speed feedback control system does not contain any time consuming operation, the speed control system has a rapid response.

In addition to the speed compensation value, an oscillation compensation value is also added in the summer 16 to the output signal S4 from the circuit 15. The purpose of the oscillation compensation value is to suppress a minute oscillation of the rotor of the motor 1 in the peripheral direction or in the rotational direction. In an experiment conducted by the inventor, it is confirmed that when the rotor of the SR motor 1 is being driven in a given direction, for example, for clockwise rotation, the rotor momentarily oscillates, namely, rotates counter-clockwise when viewed microscopically. If such oscillation which results from the reverse rotation can be suppressed, the SR motor 1 will be driven more smoothly, reliably reducing the level of acoustic noises.

Figure 8:
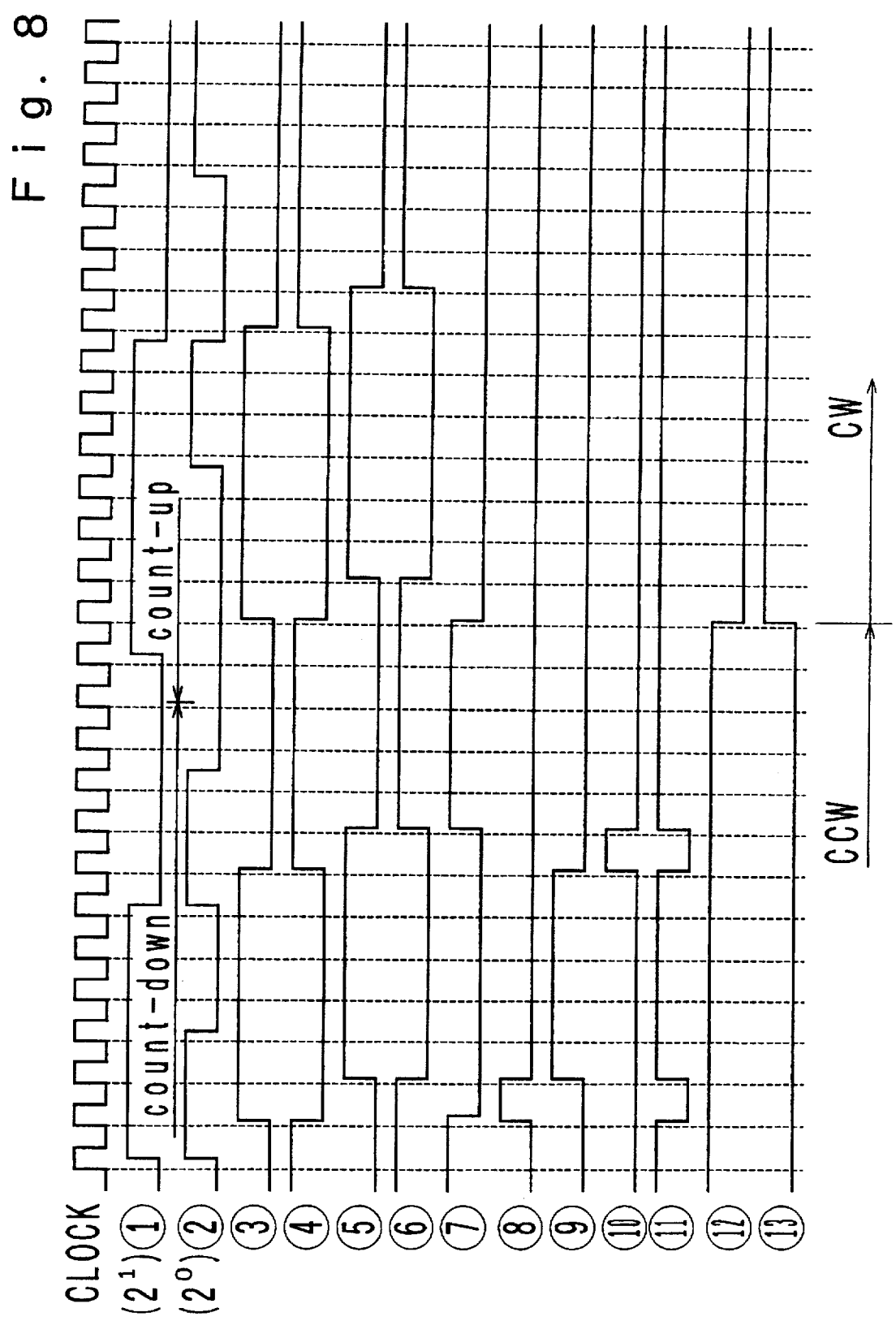

Accordingly, in the present embodiment, a reverse rotation which occurs during the time the rotor is being driven for rotation is detected, and an oscillation compensation value is produced which acts to suppress such reverse rotation and is fed to the summer 16 to provide a compensation of the resulting current value. A control system which produces such oscillation compensation value is also separate from the generation of the current waveform, thus assuring a tracking capability with respect to a rapid change (oscillation). Specifically, the direction detector circuit 5 shown in FIG. 7a is used to detect either rotational direction CW/CCW (clockwise/counter-clockwise) of the rotor of the SR motor 1, based on the least significant two bits of a signal delivered from the angle sensor 1d. Referring to FIG. 7a, the direction detector circuit 5 comprises D-type flipflops 51, 52 and 58, and gate circuits 53, 54, 55, 56 and 57. The waveforms of various signals appearing in the direction detector circuit 5 are shown in FIGS. 7b and 8. CLOCK is applied to each of the flipflops 51, 52 and 58. A signal ① corresponds to the second least significant bit $2^1$ of 11 bits, detected angle data delivered from the angle sensor 1d, and a signal ② corresponds to the least significant bit $2^0$. The signal ② changes from a low level to a high level or conversely for each rotation of the rotor through 0.35°. The signal ① is switched between a high and a low level in synchronism with the signal ② for each rotation of the rotor through 0.7°. The phase of the signal ② relative to the signal ① differs by 180° in electrical angle of the signal ② between the clockwise and counter-clockwise rotation of the rotor. The direction detector circuit 5 determines if the phase of the signal ② relative to the signal ① represents either CW or CCW. A lag involved with the determination is less than one-half period (0.35°) of the signal ②, and thus the direction detector circuit 5 detects the rotational direction of the rotor during the rotation thereof through an angle on the order of 0.35°.

Figure 14:
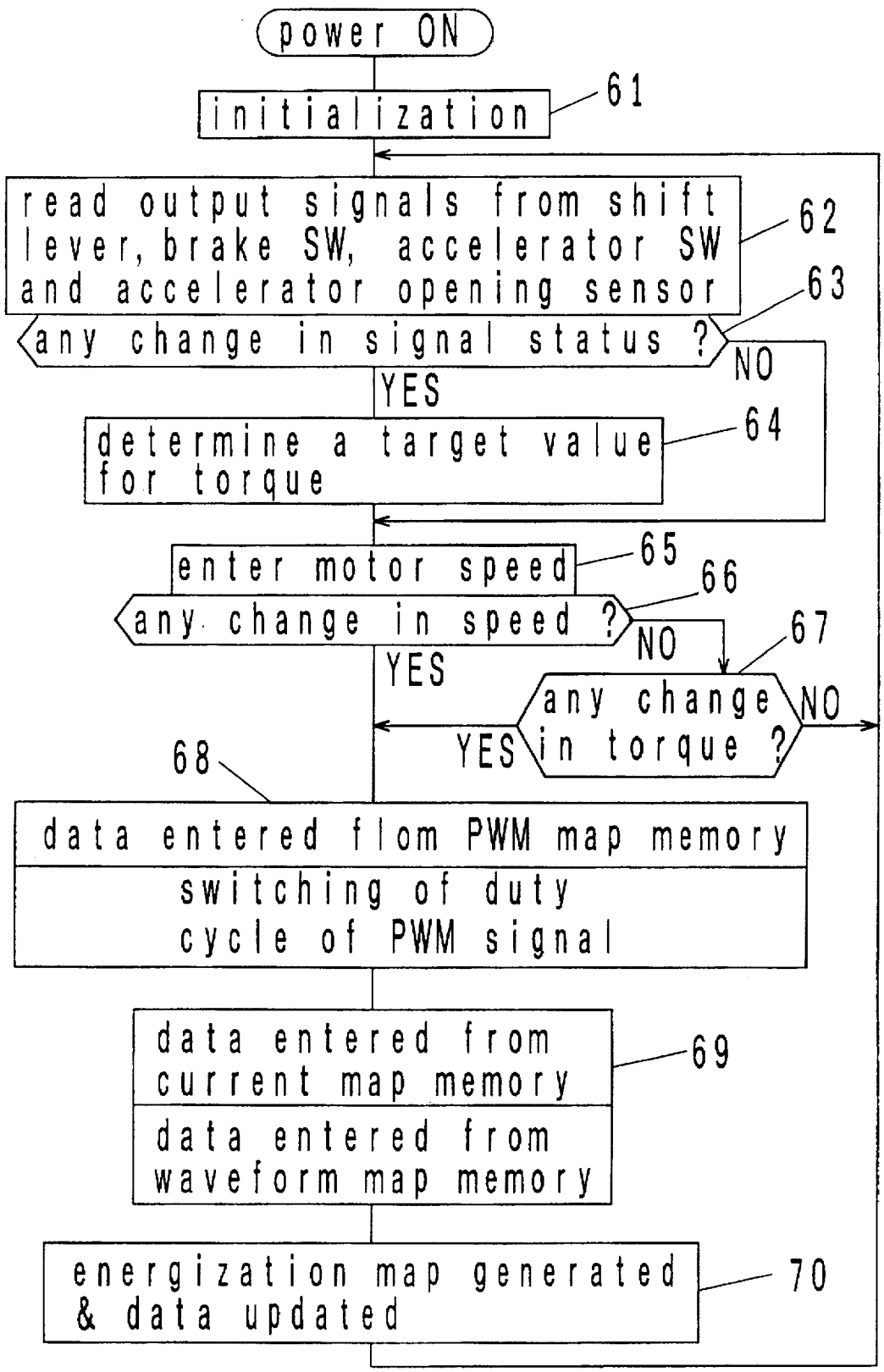
FIG. 14 is a flow chart of a motor drive control performed by CPU 11 shown in FIG. 1b.

A control operation performed by CPU 11 shown in FIG. 1 is schematically indicated in FIG. 14. When the power is turned on, CPU 11 executes an initialization at step 61. Thus, internal memories within CPU 11 are initialized, internal timers and an interrupt mode are set up, followed by a system diagnosis. If no abnormality is found, the operation proceeds to the next step.

At step 62, the status of signals delivered from the shift lever, brake switch, accelerator switch and accelerator opening sensor are read. If there is any change in the status detected at step 62, the operation proceeds to step 64. Otherwise, the operation proceeds to step 65.

At step 64, a target value of the driving torque for the SR motor 1 is determined on the basis of various status detected at step 62. For example, when the accelerator opening sensor has detected an increased accelerator opening, a target value of the driving torque is also increased. Here, a torque change flag, indicating that there has been a change in the target torque, is set.

At step 65, the detected or current rotational speed of the SR motor 1 is fed as an input. It is to be noted that the rotational speed is detected by an interrupt operation to be described later. When there is a change in the rotational speed of the SR motor 1, the operation proceeds from step 66 to step 68. On the other hand, if there is no change in the rotational speed, the operation proceeds to step 67 where the status of the torque change flag is examined, and when it is set, indicating that there has been a change in the target torque, the operation proceeds to step 68. When there is no change in the torque, the operation returns to step 62.

At step 68, PWM map memory 13b is accessed to read data therefrom, and the duty cycle of the pulse signal (PWM signal) S10 is changed in accordance with the data read. The pulse signal S10 is normally delivered during the time the motor 1 is being driven, and has a fixed period corresponding to 15 kHz, but the duty cycle of the pulse signal is changed under the prevailing condition. Thus, the PWM map memory 13b is a read-only memory having a variety of data stored therein. Several groups of data stored in the memory 13b is shown in the Table 1 below.

TABLE 1

| | | | | PWM map | | | | |
|---|---|---|---|---|---|---|---|---|
| | | | | | torque (N · m) | | | |
| | | ... | 10 | 15 | 20 | 25 | 30 | ... |
| number of revolutions (rpm) | 200 | . | P11 | P21 | P31 | P41 | P51 | . |
| | 300 | . | P12 | P22 | P32 | P42 | P52 | . |
| | 400 | . | P13 | P23 | P33 | P43 | P53 | . |
| | 500 | . | P14 | P24 | P34 | P44 | P54 | . |
| | . | . | . | . | . | . | . | . |
| | . | . | . | . | . | . | . | . |

Figure 13:
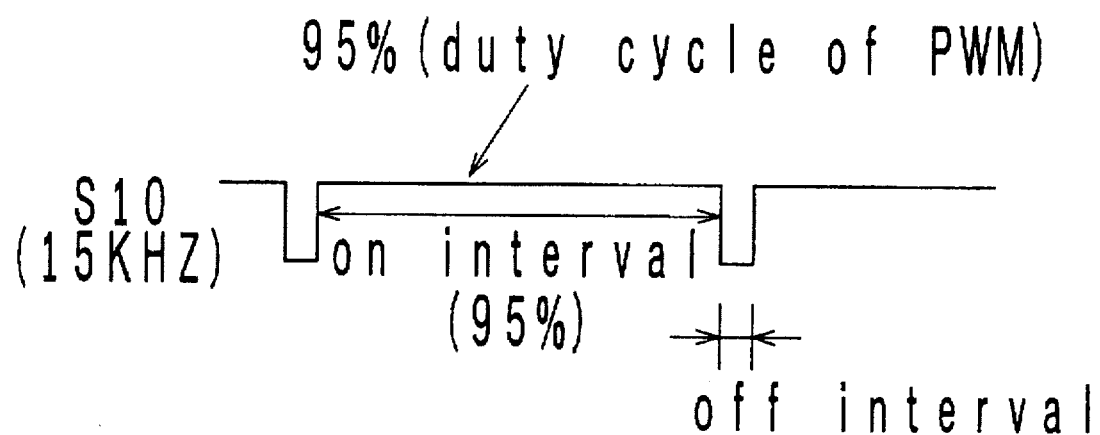

Memory 13b (Table 1) contains a multiplicity of data items Pnm, where n represents a column number corresponding to the torque, and m represents a row number corresponding to the number of revolutions. By way of example, data item P34 contains a figure indicating an on duty cycle of 95%. Accordingly, if the torque is 20 N.m and the number of revolutions is 500 rpm, CPU 11 refers to the data item P34, and updates the duty cycle so that the on interval of the signal S10 is equal to 95%. This produces a pulse waveform as shown in FIG. 13 for the signal S10.

Returning to FIG. 14, at step 69, data is read from the current map memory 13a and the waveform map memory 13c. In this embodiment, both the current map memory 13a and the waveform map memory 13c are read-only memories having a variety of data stored therein. Several groups of data contained in the current map memory 13a is indicated in the Table 2 below, and the several groups of data contained in the waveform map memory 13c is indicated in the Table 3 below.

TABLE 2

| | | | | current map | | | | |
|---|---|---|---|---|---|---|---|---|
| | | | | | torque [N · m] | | | |
| | | ... | 10 | 15 | 20 | 25 | 30 | 35 | ... |
| number of revolutions [rpm] | 200 | . | C11 | C21 | C31 | C41 | C51 | C61 | . |
| | 300 | . | C12 | C22 | C32 | C42 | C52 | C62 | . |
| | 400 | . | C13 | C23 | C33 | C43 | C53 | C63 | . |
| | 500 | . | C14 | C24 | C34 | C44 | C54 | C64 | . |
| | 600 | . | C15 | C25 | C35 | C45 | C55 | C65 | . |
| | 700 | . | C16 | C26 | C36 | C46 | C56 | C66 | . |
| | . | . | . | . | . | . | . | . | . |
| | . | . | . | . | . | . | . | . | . |

The current map memory (Table 2) contains a multiplicity of data items Cnm, where n represents a column number corresponding to the torque, and m represents a row number corresponding to the number of revolutions. One data item Cnm contains an energization on angle, an energization off angle, a current upper limit and a waveform pattern number. For example, data item C34 for a torque of 20 N.m and a number of revolutions of 500 rpm contains 52.5°, 82.5°, 200 A and a waveform pattern No. 3. This data item C34 indicates energization information in a range of rotational positions from 0° to 90°. Specifically, in a range from 52.5° to 82.5°, a current of a predetermined waveform pattern No. 3 and having an upper limit of current of 200 A is passed while the current supply is interrupted in a range from 0° to 52.5° and from 82.5° to 90°. A resulting current waveform is shown in FIG. 19. At step 69, one data item Cnm which is selected in accordance with the prevailing torque and the number of revolutions is read.

TABLE 3 waveform map

| rotor angle step No. | waveform pattern | | | |
|---|---|---|---|---|
| | pattern No. 1 | pattern No. 2 | pattern No. 3 | ... |
| 0 | 255 | 0 | 0 | |
| 1 | 255 | 12 | 12 | |
| 2 | 255 | 26 | 26 | |
| 3 | 255 | 40 | 40 | |
| . | . | . | . | . |
| . | . | . | . | |
| . | . | . | . | |
| 86 | 255 | 255 | 15 | |
| 87 | 255 | 255 | 8 | |
| 88 | 255 | 255 | 3 | |
| 89 | 255 | 255 | 255 | |

Figure 21A:
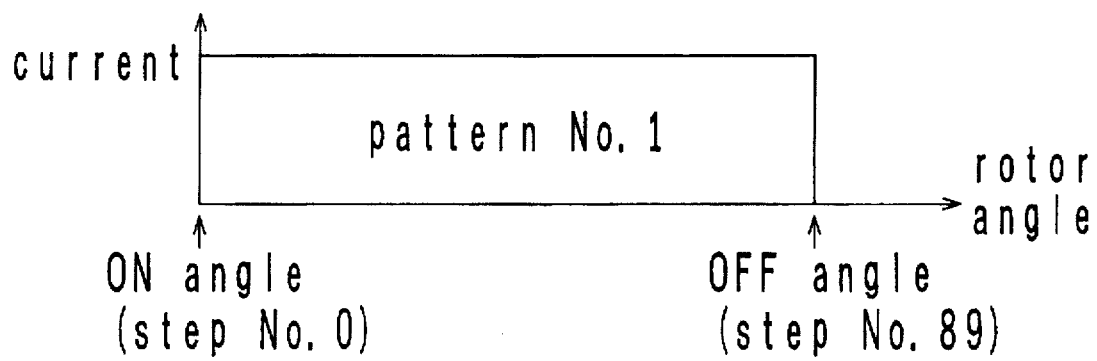
Figure 21B:
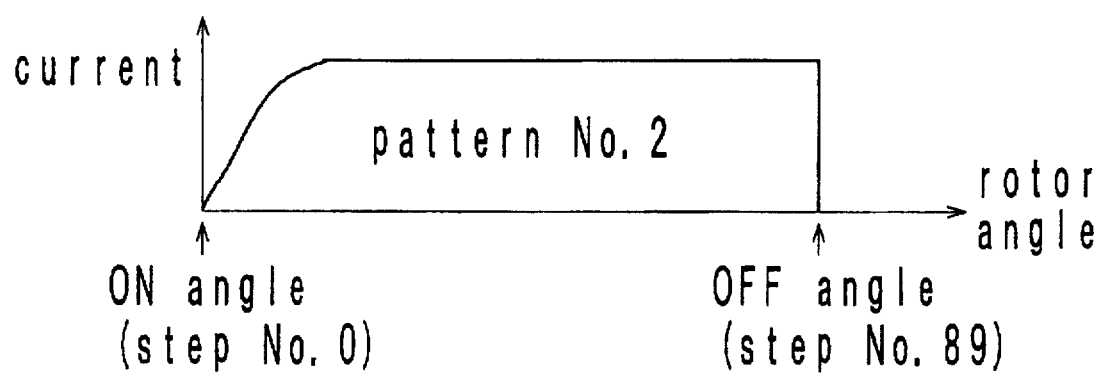
FIG. 21b graphically shows a current waveform formed according to data of the map memory 13c of pattern No. 2.
Figure 21C:
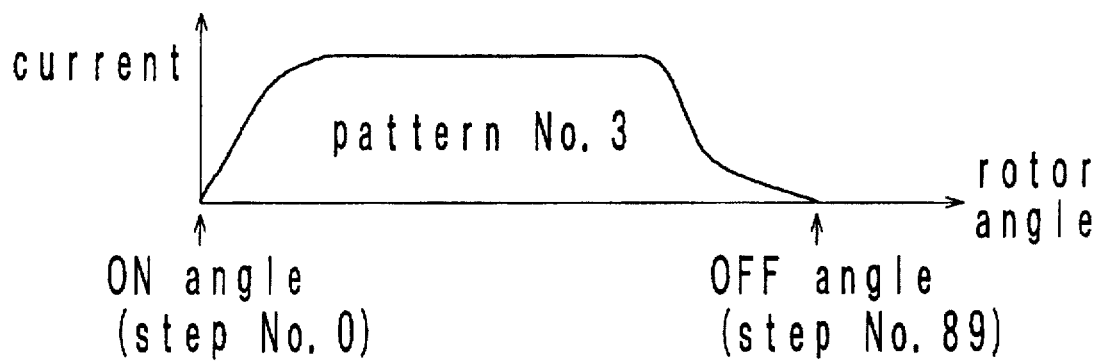
FIG. 21c graphically shows a current waveform formed by data of the map memory 13c of pattern No. 3.

One set of waveform data corresponding to the number of the waveform pattern contained in the data item Cnm is read from the waveform map memory 13c (Table 3). By way of example, when the number of the waveform pattern is 3, a series of waveform data including 0, 12, 26, 40, - - - under the column of waveform pattern No. 3 in the Table 3 are entered. A waveform for the current reference value which is actually passed through the coil in accordance with such waveform data is determined as indicated in FIG. 21c. When the number of the waveform pattern is 1, a waveform as shown in FIG. 21a is used. For a waveform pattern No. 2, a waveform as shown in FIG. 21b results. In this manner, a fine adjustment of the current reference value takes place for each angular step of rotor of the motor.

At step 70, data for an energization pattern is produced on the basis of data item Cnm and waveform data which are entered at step 69. Specifically, a multiplicity of current reference values and associated data (to be described in detail later) corresponding to each angular step of the rotor of the motor are produced. The data for energization pattern is written into a memory (bidirectional RAM 49 shown in FIG. 4b) within the current waveform generating circuit 15. As will be described later, the circuit 25 automatically produces data for phase 1 to 3 on the basis of data for one phase which is chosen as a reference. Accordingly, at step 70, an energization pattern for a specific one phase is produced, and is written into the bidirectional RAM 49 within the circuit 15.

CPU 11 repeatedly executes the steps 62 to 70. When the rotational speed and the torque of the SR motor which are detected remain constant, the operation loops around the steps 66–67–62, but when there is a change in the rotational speed or the torque, the operation enters the execution of the steps 68–69–70, thus updating the energization pattern produced within the circuit 15.

Figure 15:
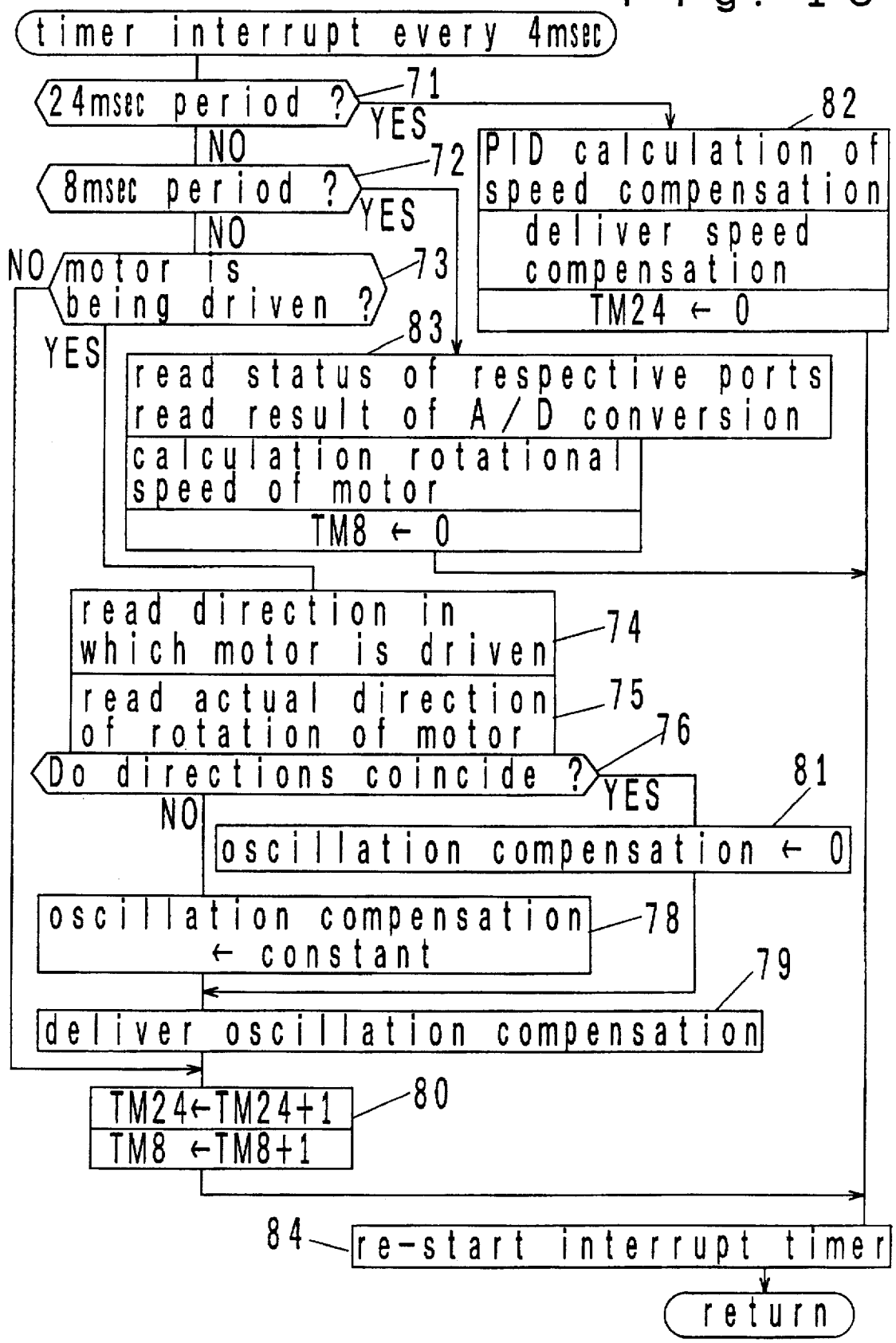
FIG. 15 is a flow chart of a timer interrupt operation performed by CPU 11 shown in FIG. 1b.

Upon completion of initialization which takes place at step 61, a timer interrupt occurs within the CPU 11 every 4 msec. When a timer interrupt occurs, CPU 11 executes the operation depicted in FIG. 15. Referring to FIG. 15, at step 71, CPU 11 refers to a count in a counter TM24 to see if it occurred at a given timing, which is chosen to be a period of 24 msec. Thus, the operation proceeds from step 71 to step 82 at a rate of one run per 24 msec. If the period is not as chosen, the operation proceeds from step 71 to step 72.

At step 72, a count in a counter TM8 is referred, examining if it occurred at a given timing, which is chosen to be a period of 8 msec. Thus, in this instance, the operation proceeds from step 72 to step 83 at a rate of one run every 8 msec, otherwise, the operation proceeds from step 72 to step 73.

At step 82 which is executed at a rate of one run every 24 msec, a speed compensation value is initially formed. Specifically, a given PID (proportional/integral/differential) calculation is executed on the basis of a target driving speed and a detected rotational speed of the motor 1, and a result of calculation is provided as a speed compensation value, which is fed to the summer 16 (FIG. 2), while clearing the counter TM24.

At step 83 which is executed at a rate of one run every 8 msec, status of the shift lever, brake switch, accelerator switch and accelerator opening sensor are read through the input interface 12 (FIG. 1b), and the results stored in an internal memory. The rotational speed of the motor is also calculation. In the present embodiment, the angle sensor 1d connected to the drive shaft of the SR motor 1 delivers a pulse signal having a period which varies with the rotational speed of the drive shaft. Accordingly, CPU 11 determines a period with which detected angle data RZ0 to RZ10 delivered from the angle sensor 1d changes, and based on this period, calculates the rotational speed of the SR motor 1. Data representing the rotational speed is stored in an internal memory. The counter TM8 is cleared at step 83.

At step 73, it is examined if the SR motor 1 is being driven. If the motor is being driven, the operation proceeds to step 74, and otherwise the operation proceeds to step 80. At step 74, it is examined if the current rotational direction (the direction in which the rotor is to be driven) is CW or CCW. At next step 75, it is examined if a direction detection signal (13) from the direction detector circuit 5, or the current actual rotational direction of the rotor, is either CW or CCW.

At step 76, an examination is made to see if the rotational direction in which the rotor is to be driven as determined at step 74 coincides with the actual rotational direction as determined at step 75. If they match, the operation proceeds to step 81, setting an oscillation compensation value to 0. If a mismatch is found, indicating that a reverse rotation of the rotor is occurring as a result of oscillation, the operation proceeds to step 78 where a predetermined constant is chosen for the oscillation compensation value. In this embodiment, the constant (current value) chosen for the oscillation compensation value at step 78 is selected as +30 A. At next step 79, the oscillation compensation value which is determined at either step 78 or 81 is delivered, and is applied to the summer 16 (FIG. 2). It is to be noted that this oscillation compensation value is used in common for the control systems of the three phases.

At step 80, the counters TM24 and TM8 are incremented by one. At step 84, the interrupt timer is re-started in order to enable a next run of interrupt operation.

Figure 9:
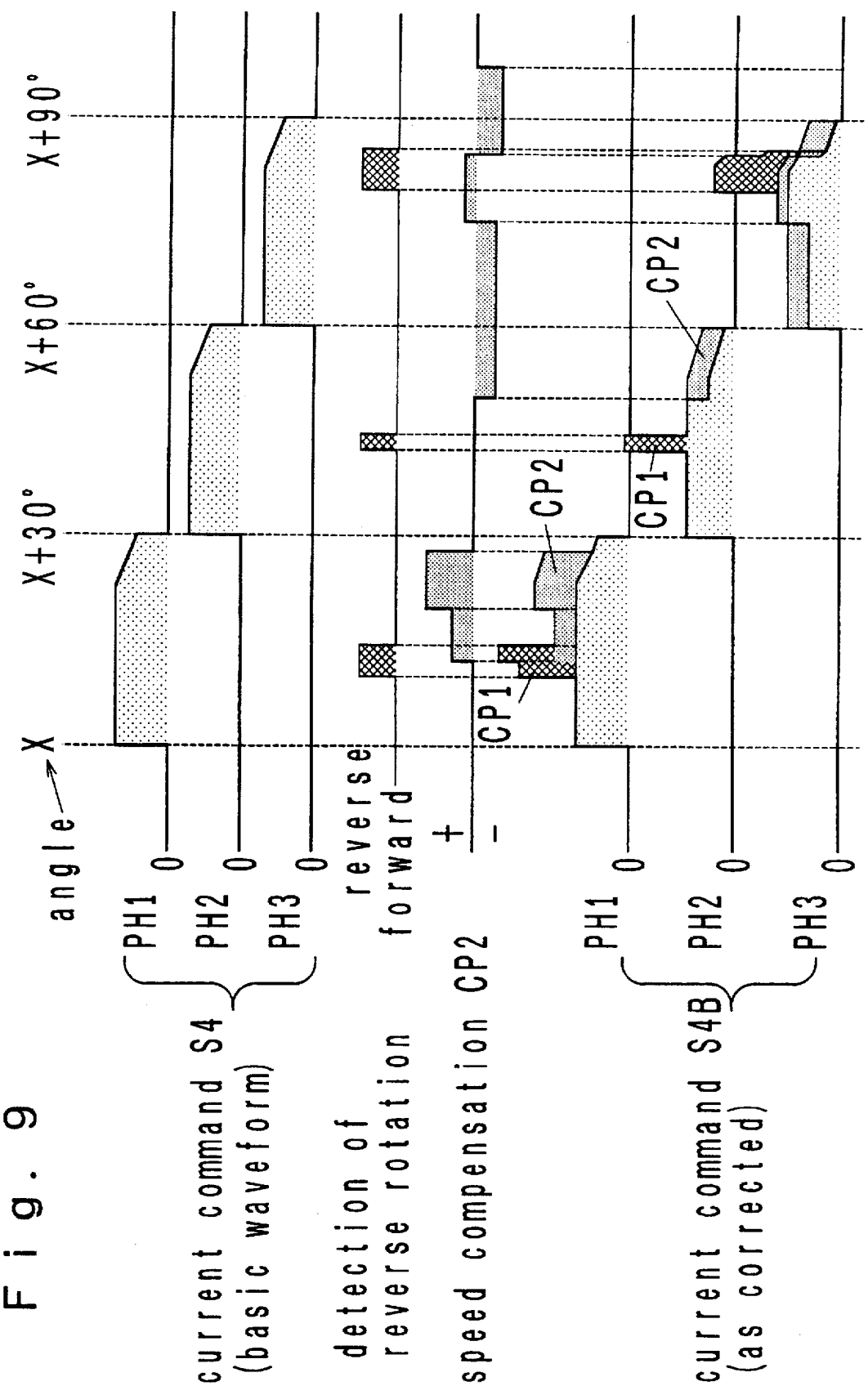
FIG. 9 is a series of timing charts indicating changes occurring in an input signal S4 and an output signal S4B of the summer 16 shown in FIG. 1b.

A current waveform which results from the current command value S4 delivered from the current waveform generating circuit 15 and the current command value S4B as corrected by the summer 16 is shown in FIG. 9 where CP1 represents an oscillation compensation value and CP2 a speed compensation value. It is to be noted that the oscillation compensation value CP1 and the speed compensation value CP2 are used in common for the three phases. When the current command value S4 is equal to 0, the corrected current command value S4B is also made equal to 0. By summing the oscillation compensation value C1 to the current command value S4, the oscillation of the SR motor 1 is suppressed, thus reducing the acoustic noises. By summing the speed compensation value CP2 to the current command value S4, the response in controlling the speed of the SR motor 1 is improved.

Since a three phase SR motor 1 is driven in the present embodiment, it is necessary to produce current command values which are to be passed through the respective phase coils for three phases. In the embodiment, it is intended that the energization waveform be optimized for adjusting the current command value for each rotation of the rotor through a minute angle (0.7° or one step), and accordingly it is very difficult to produce a current command value S4. In addition, since the current command value must be changed for each rotation of the rotor through one step, the updating of the current command value S4 must be capable of being executed momentarily. To produce a signal in this manner, a multiplicity of current command values may be previously stored in the current map memory 13a and an address of the memory 13a may be associated with the angle of rotation of the rotor so that for each change of the angle of rotation of the rotor, angle data may be applied to the memory 13a at the corresponding address so as to read a current command value corresponding to this angle from the memory 13a for application to the summer 16. A triple set of such control circuits may be provided to produce the current command values for three phases.

However, it will be seen that if a triple set of independent current waveform generating circuits are provided for the three phases, a resulting memory capacity required will be voluminous and the complification of the circuit arrangement is unavoidable. In addition, since CPU 11 must rewrite the energization map for any change in the number of revolutions or the required torque of the motor, an updating of all the content of a memory having a voluminous capacity will be very time consuming, thus degrading the response of the control system.

Figure 20:
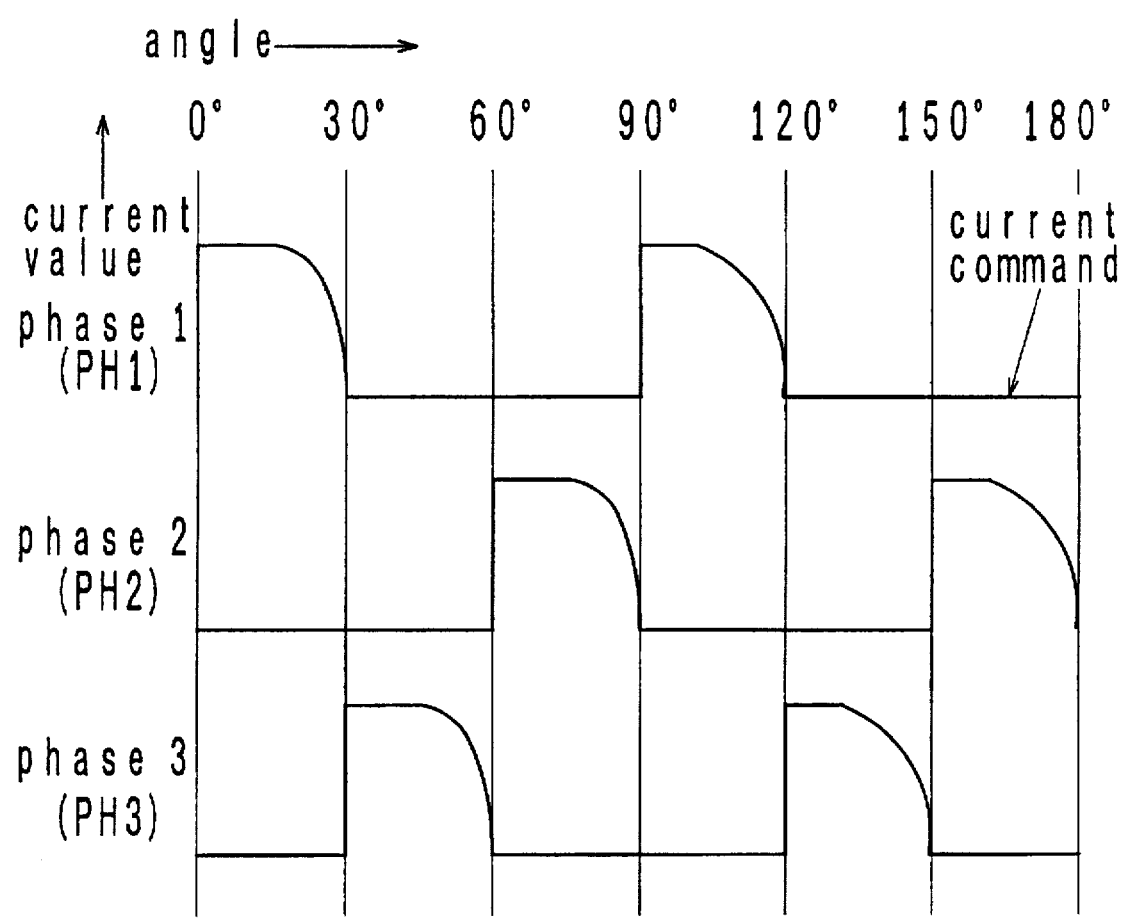

However, as will be noted from FIGS. 9 and 20, the waveform of the current command values for the three phases are analogous to each other, only differing in the phase or relative angle of the waveform. Accordingly, using the waveform of current command value for one phase which is chosen as a reference, it is possible to produce current command values for the three phases by phase displacing the reference waveform.

Figure 5A:
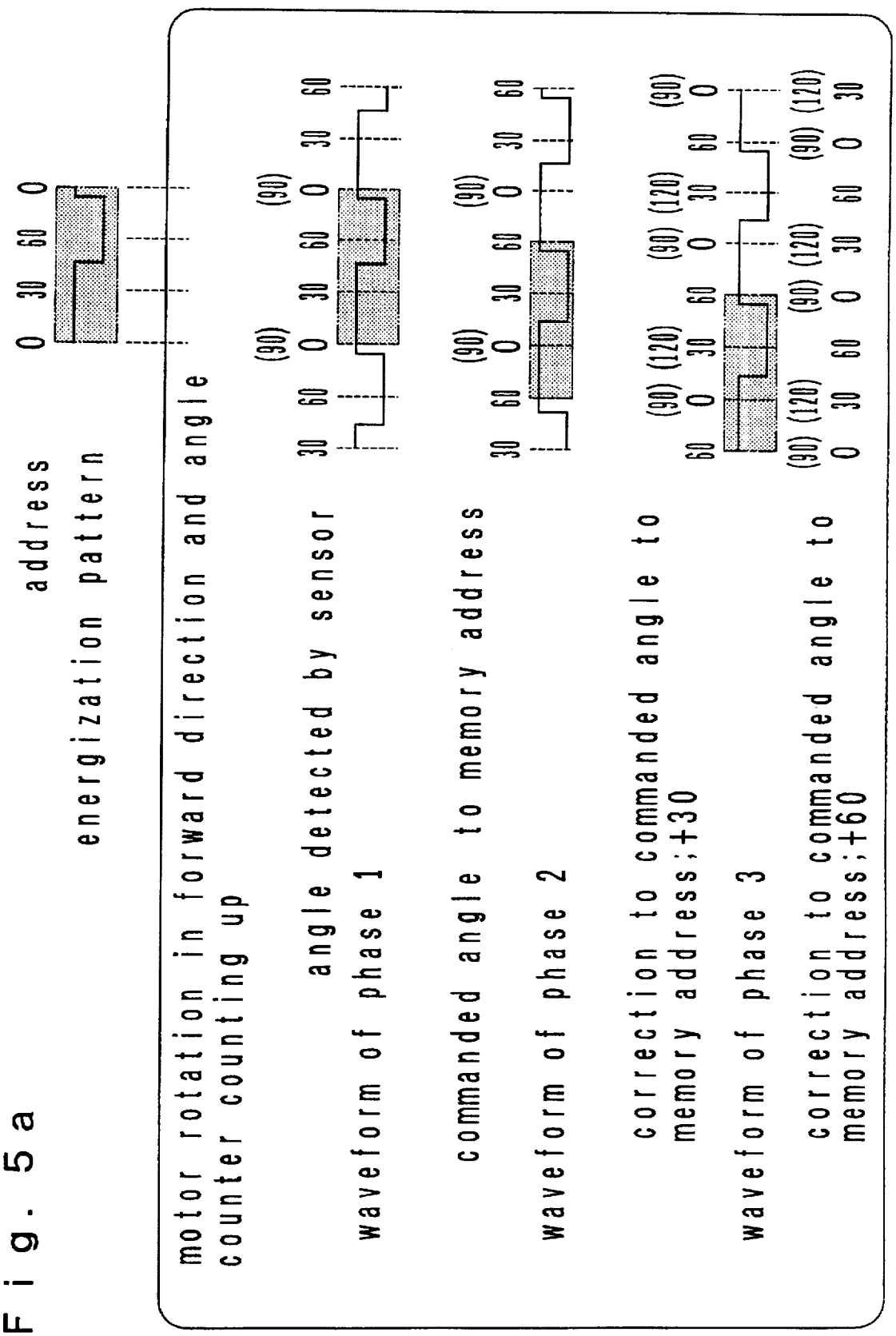
FIG. 5a is a series of timing charts of a signal generated by the circuit 15 shown in FIG. 1b on the basis of data contained in its memory 49, and output currents delivered to the electrical coils of an electric motor 1 when it is driven for rotation in the forward direction and which are produced by the first to the third phase driver 18 to 20 shown in FIG. 1a based on the signal from the circuit 15, the charts indicating an approximate level change of such current.
Figure 5B:
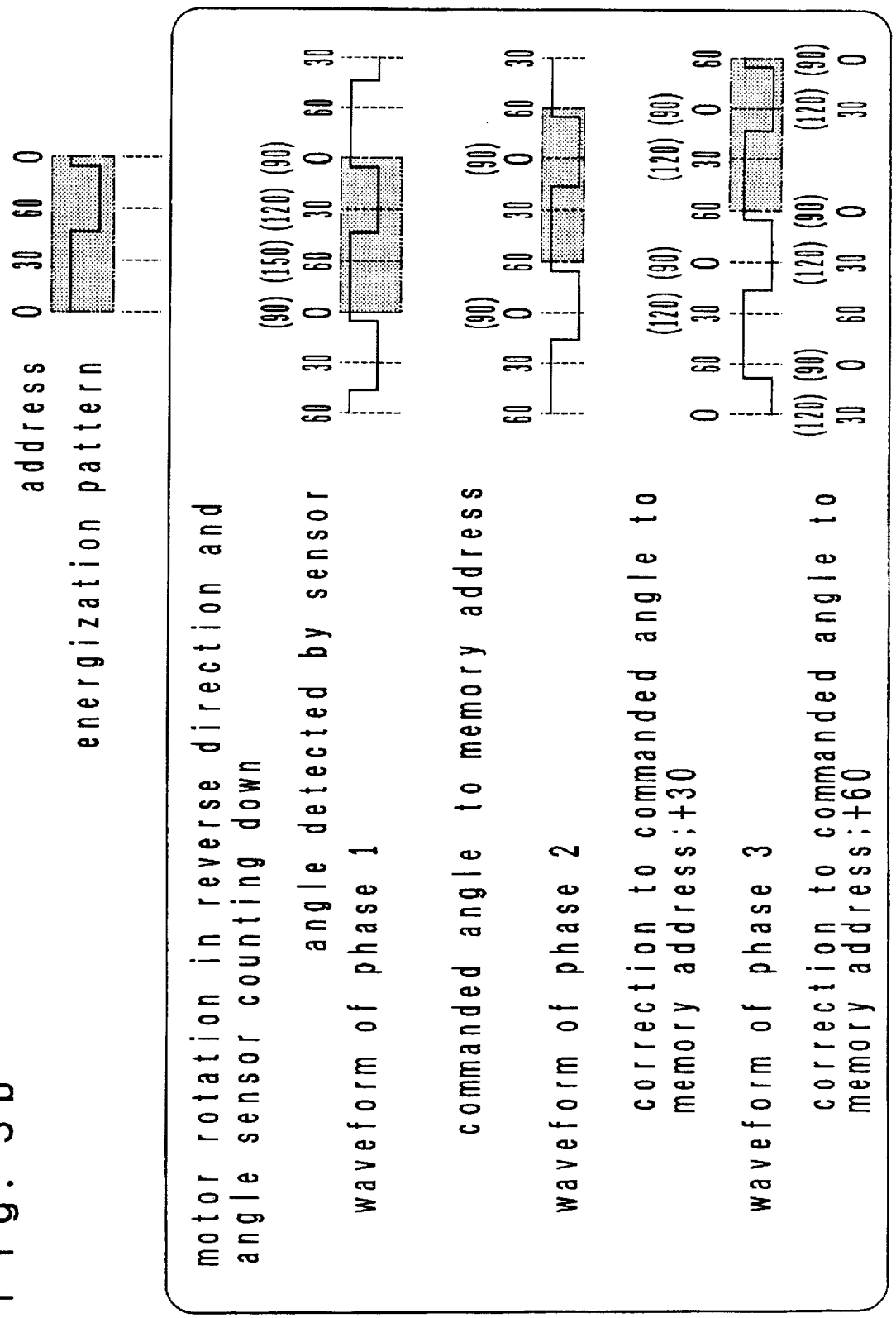
FIG. 5b is a series of timing charts of a signal generated by the circuit 15, and output currents delivered from the drivers 18 to 20 shown in FIG. 1a based on the signal from the circuit 15, to the electrical coils of the motor 1 when it is driven for rotation in the reverse direction, the charts indicating an approximate change in the current level.

As an example, FIG. 5a illustrates that when a multiplicity of waveform data (energization pattern shown as hatched) associated with each angular step within the range from 0° to 90° of the phase 1 is stored in a memory, it is possible to derive waveform data for phase 2 by adding +30° to the indicated angle used as a memory address, and to derive waveform data for phase 3 by adding +60° to the indicated angle used as a memory address. By repeating the waveform in the range from 0° to 90° for the phase 1, an entire waveform data covering a range from 0° to 360° can be obtained. Thus, by storing a group of waveform data (energization pattern) for one phase which is chosen as a reference in a memory, signal waveforms for all the three phases can be derived therefrom. This reduces the required memory capacity, simplifies the circuit arrangement and also reduces the time required to update the memory content.

Figure 6:
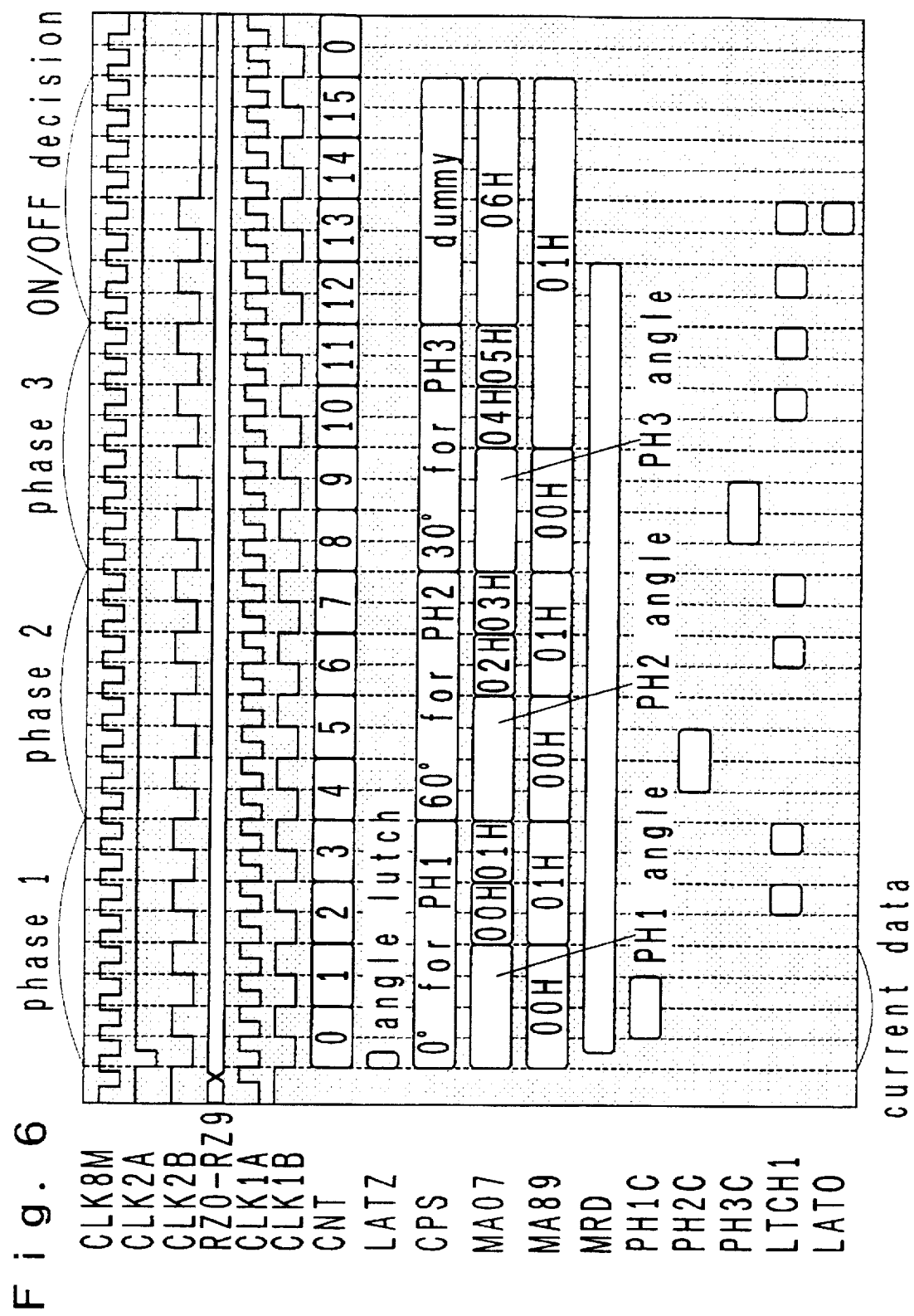
FIG. 6 is a series of timing charts of control signals and control data delivered from the circuit 15 shown in FIG. 1b, principally indicating a change therein.

Referring to FIG. 4 which shows the construction of the current waveform generating circuit 15 and FIG. 6 which indicates the timing of various signals occurring therein, an energization pattern produced by CPU 11 is written into the bidirectional RAM (read-write memory) 49 within the circuit 15. In this embodiment, the bidirectional RAM 49 includes a pair of memory banks, and waveform data is read from one of the memory banks while data from CPU 11 is entered into the other bank. In this manner, a read-out of waveform data and writing of data from CPU 11 can take place substantially simultaneously.

The memory bank 1 in the bidirectional RAM 49 is allocated to memory addresses D800H to D886H (H representing a hexadecimal notation), while the memory bank 2 is allocated to memory addresses from DC00H to DC86H. The following data is written into the memory bank 1.

D800H to D87FH (128 bytes): a current value every 0.7° increment of the angle of rotation (90°: 128 steps)

D880H: angle 1 of phase 1 (angle of commencement or termination of energization)

D881H: angle 2 of phase 1 (angle of termination or commencement of energization)

D882H: angle 1 of phase 2 (angle of commencement or termination of energization)

D883H: angle 2 of phase 2 (angle of termination or commencement of energization)

D884H: angle 1 of phase 3 (angle of commencement or termination of energization)

D885H: angle 2 of phase 3 (angle of termination or commencement of energization)

D886H: waveform border (a border representing the commencement of energization at angle 1→termination of energization at angle 2, the termination of energization at angle 1→commencement of energization at angle 2).

The allocation of memory in the memory bank 2 remains the same as in the memory bank 1 except that the address is displaced by 400H. A switching between the memory banks 1 and 2 takes place by controlling a bit 10 (A10) of the address of the bidirectional RAM 49.

Figure 4A:
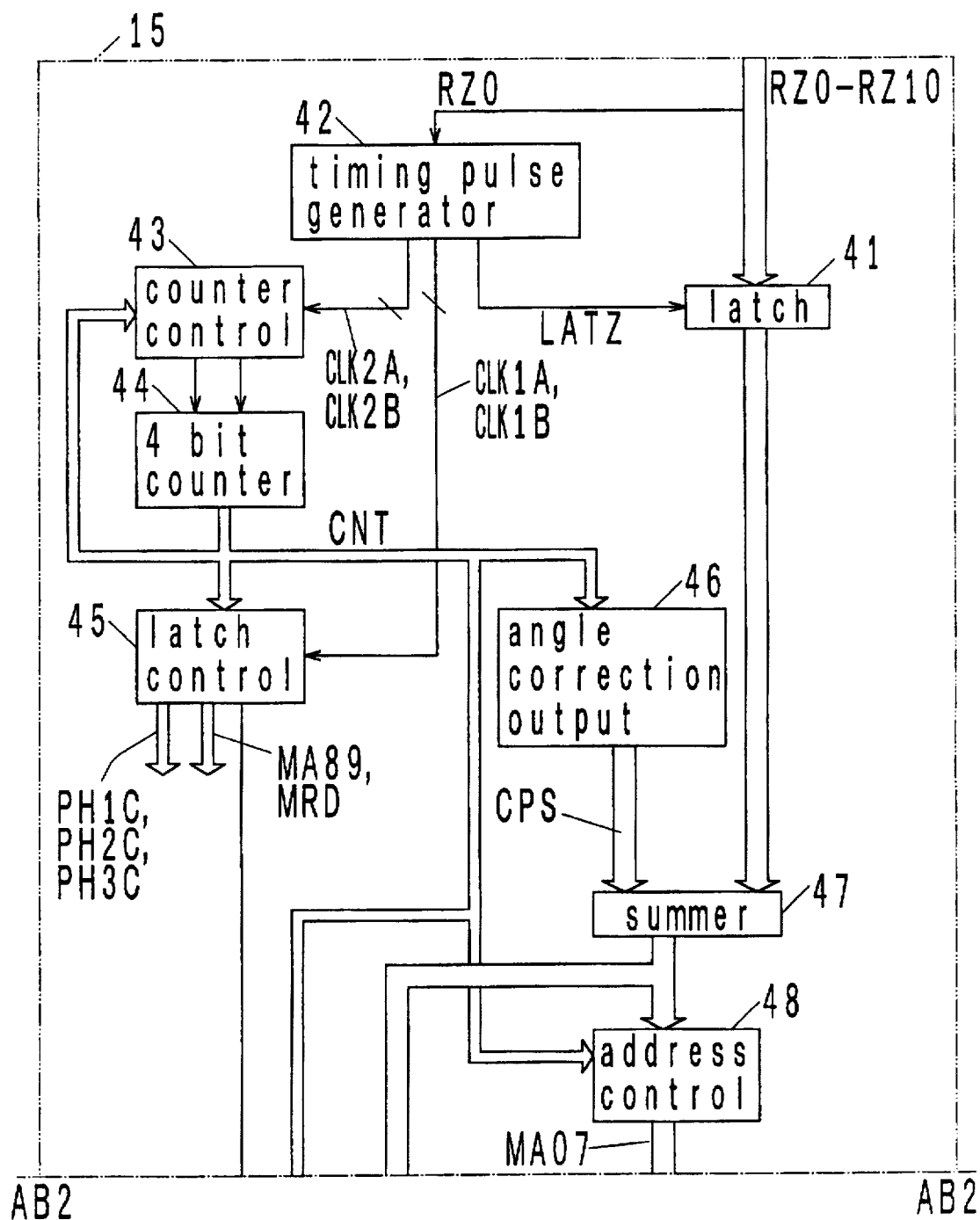
FIG. 4a is a block diagram of substantially upper half of a current waveform generating circuit 15 shown in FIG. 1b.
Figure 4B:
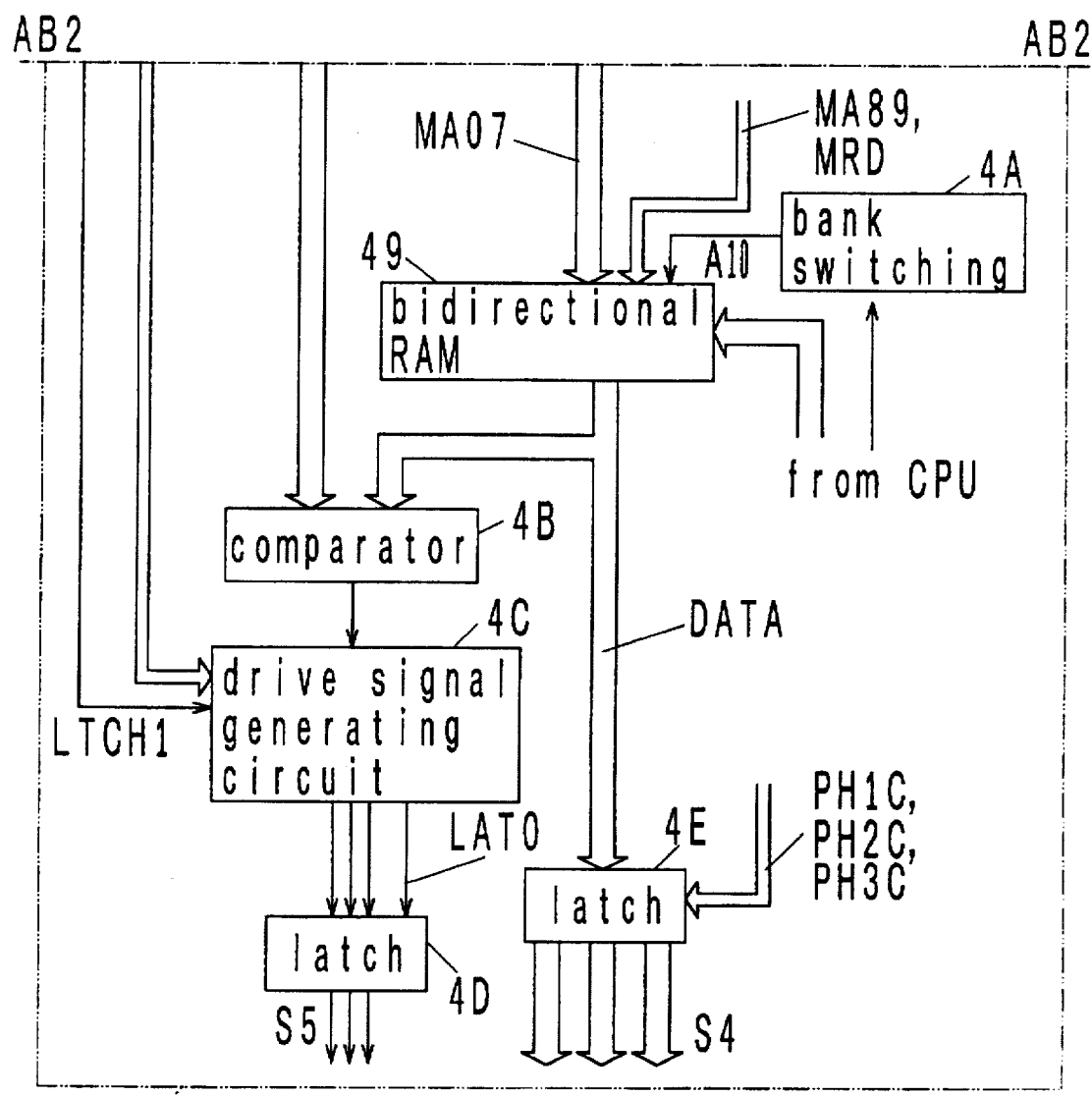
FIG. 4b is a block diagram of substantially lower half of the current waveform generating circuit 15 shown in FIG. 1b, FIGS. 4a and 4b being joined together along a line AB2—AB2 to represent the entire circuit 15 in one block diagram.

With continued reference to FIGS. 4a, 4b and 6, detected angle data RZ0 to RZ10, including 11 bits, which are delivered from the angle sensor 1d, is latched in a latch 41, and thence fed to a summer 47. The least significant bit signal RZ0 in the angle data is applied to a timing pulse generator circuit 42, which produces clock pulses CLK1A, CLK1B, CLK2A, CLK2B and latch control signal LATZ, based on an 8 MHz clock pulse CLK8N, internally generated therein and the bit signal RZ0. A 4 bit counter 44 counts the clock pulse CLK2B delivered from the timing pulse generator circuit 42, and repeatedly delivers a figure in a range from 0 to 15 sequentially as a count CNT. The operation of various circuits within the circuit 15 is determined in accordance with the count CNT from the counter 44. The count CNT is fed to a latch control circuit 45, an angle correction output circuit 46, an address control circuit 48 and a drive signal generating circuit 4C.

The angle correction output circuit 46 is an encoder, which delivers a correction value CPS, as indicated below, in accordance with the count CNT fed:

| CNT: 0 to 3 | CPS: 0 (0°) |
|---|---|
| CNT: 4 to 7 | CPS: 84 (60°) |
| CNT: 8 to 11 | CPS: 42 (30°) |
| CNT: 12 to 15 | CPS: 42 (30°; dummy) |

Accordingly, when the count CNT is from 0 to 3, a rotational position of the rotor (angle: RZ0–RZ10) directly appears at the output of a summer 47. However, when the count CNT is from 4 to 7, 60° is summed (or the rotational position is shifted) and when the count CNT is from 8 to 11, 30° is summed. The output of the summer 47 is not utilized when the count CNT is from 12 to 15.

The address control circuit 48 delivers 8 bit data MA07 as follows, in accordance with the count CNT fed:

| CNT: 0, 1, 4, 5, 8, 9 | MA07: output from summer 47 |
|---|---|
| CNT: 2 | MA07: 0 |
| CNT: 3 | MA07: 1 |
| CNT: 6 | MA07: 2 |
| CNT: 7 | MA07: 3 |
| CNT: 10 | MA07: 4 |
| CNT: 11 | MA07: 5 |
| CNT: 12 to 15 | MA07: 6 |

The latch control circuit 45 delivers 2 bit data MA89, as follows, in accordance with the count CNT fed. It is to be noted that a memory read-out signal MRD is effective when the count CNT is from 0 to 12:

| CNT: 0, 1, 4, 5, 8, 9 | MA89: 00H |
|---|---|
| CNT: 2, 3, 6, 7, 10 to 15 | MA89: 01H |

8 bit data MA07 delivered from the address control circuit 48 is applied to the least 8 bits in the address of the bidirectional RAM. 2 bit data MA89 delivered from the latch control circuit 45 is applied to the eighth and the ninth bit in the address of the bidirectional RAM. Accordingly, the address specified by the least 10 bits of the bidirectional RAM 49 depends on the count CNT as follows:

| CNT: 0, 1, 4, 5, 8, 9 | MA07: output from summer 47 |
|---|---|
| CNT: 2 | MA07: 0100H |
| CNT: 3 | MA07: 0101H |
| CNT: 6 | MA07: 0102H |
| CNT: 7 | MA07: 0103H |
| CNT: 10 | MA07: 0105H |
| CNT: 11 | MA07: 0105H |
| CNT: 12 to 15 | MA07: 0106H |

Thus, information as indicated below is read from the bidirectional RAM 49 depending on the count CNT which is fed:

| CNT: 0, 1 | DATA: current value (phase 1) for present angle of rotation |
|---|---|
| CNT: 2 | DATA: angle 1 of phase 1 |
| CNT: 3 | DATA: angle 2 of phase 1 |
| CNT: 4, 5 | DATA: present angle of rotation + current value for 60° (current value for phase 2) |
| CNT: 6 | DATA: angle 1 of phase 2 |
| CNT: 7 | DATA: angle 2 of phase 2 |
| CNT: 8, 9 | DATA: present current value + current value for 30° (current value for phase 3) |

-continued

| CNT: 10 | DATA: angle 1 of phase 3 |
|---|---|
| CNT: 11 | DATA: angle 2 of phase 3 |
| CNT: 12 to 15 | DATA: waveform border |

Current value for phase 1 (DATA: 8 bits) delivered from the bidirectional RAM 49 when the count CNT is either 0 or 1 is latched into a latch 4E in synchronism with a signal PH1C delivered from the latch control circuit 45. Similarly, a current value for phase 2 delivered from the bidirectional RAM 49 when the count CNT is either 4 or 5 is latched into the latch 4E in synchronism with a latch control signal PH2C. A current value for phase 3 delivered from the bidirectional RAM 49 when the count CNT is either 8 or 9 is latched into the latch 4E in synchronism with a latch control signal PH3C. A triple set (for three phases) of signals S4 delivered from the latch 4E is applied to the summer 16 shown in FIG. 2.

On the other hand, a comparator 4B compares an output from the summer 47 against an output from the bidirectional RAM 49. What is actually utilized here is angle 1 for phase 1, angle 2 for phase 1, angle 1 for phase 2, angle 2 for phase 2, angle 1 for phase 3, angle 2 for phase 3 and borders of the waveform among the outputs from the bidirectional RAM 49. In other words, the comparator 4B distinguishes the relative magnitude between the current angle (plus shift of the rotor) and the angle 1 or 2 of each phase.

An output from the comparator 4B is latched into and utilized within a drive signal generating circuit 4C by a control signal LTCH1 delivered from the latch control circuit 45 when the count CNT is either one of 2, 3, 6, 7, 10, 11, 12 and 13. Specifically, an output from the comparator 4B when the count CNT is 2 or 3 is used to generate a binary signal which indicates a switching between the on/off of the energization of the phase 1. An output from the comparator 4B when the count CNT is 6 or 7 is used to produce a binary signal indicating a switching between the on/off of the energization of the phase 2. An output from the comparator 4B when the count CNT is 10 or 11 is used to produce a binary signal indicating a switching between the on/off of the energization of the phase 3. An output from the comparator 4B when the count CNT is 12 or 13 is used to produce a binary signal (S5) indicating the on/off of the energization by distinguishing the borders of the waveforms.

8 bit data delivered from the summer 47 represents a figure in a range from 0 to 127, and the-most significant bit is always 0. Angle 1 of phase 1, angle 2 of phase 1, angle 1 of phase 2, angle 2 of phase 2, angle 1 of phase 3 and angle 2 of phase 3 which are stored in the bidirectional RAM 49 are also figures in the range from 0 to 127, and the most significant bit is always 0. On the other hand, as to the borders of waveform stored in the bidirectional RAM 49, 255 is allocated to a concave waveform while 0 is allocated to a convex waveform. Accordingly, when the comparator 4B compares the borders of the waveform against the output from the summer 47, the output of the comparator 4B is determined only in accordance with the borders of the waveform independently from the output from the summer 47. Thus, the drive signal generating circuit 4C determines if the waveforms in the binary signals for three phases delivered are either concave or convex, in accordance with "border of waveform" information when the count CNT is 12 or 13.

Specifically, when the border of the waveform is equal to 0, a binary signal (S5) is produced which is off as long as (current angle)≦(angle 1 of phase 1)

on as long as (angle 1 of phase 1)<(current angle) (angle 2 of phase 1), and off as long as (angle 2 of phase 1)<(current angle).

When the border of the waveform is equal to 255, a binary signal (S5) is produced which is on as long as (current angle)≦(angle 1 of phase 1)

off as long as (angle 1 of phase 1)<(current angle)<(angle 2 of phase 1), and on as long as (angle 2 of phase 1)<(current angle).

The same applies to the binary signals (S5) for the phase 2 and phase 3.

Binary signals (S5) for phases 1, 2 and 3 which are produced by the drive signal generating circuit 4C are latched in a latch 4D. The triple set of binary signals delivered from the drive signal generating circuit 4C is latched in the latch 4D in response to a control signal LAT0 which appears in synchronism with the latch control signal LTCH1 which is delivered from the latch control circuit 45 at a timing (CNT: 13) when the status of all the binary signals are established, and is subsequently applied to the output decision circuit 17 as a triple set (for three phases) of binary signals (S5).

While a preferred embodiment of the invention has been shown and described above, a number of changes and modifications are possible therein. Accordingly, it is not intended that the invention be limited to the specific construction or arrangement disclosed herein, but that the right is reserved to all changes and modifications coming within the scope of invention defined by the appended claims.

What is claimed is:

1. An energization control system for an electric motor comprising:

means for producing a target value of an energization level of an electric motor;

direction detector means for detecting a rotational direction of a rotor of the motor;

means for producing an oscillation compensation having a value which depends on the coincidence or not between the rotational direction of the rotor indicated by the target and an actual rotational direction of the rotor, the oscillation compensation suppressing a reversal of the rotor relative to the target rotational direction when the actual rotational direction of the rotor does not coincide with the target rotational direction; and a motor driver for energizing the motor with a current of a level which corresponds to the target value of the energization level and the oscillation compensation.

2. An energization control system according to claim 1 in which said means for producing a target value includes means for detecting an angle of rotation of the rotor, memory means for storing an energization pattern including a group of target values of energization levels, each corresponding to an angle of rotation of the rotor within a given range of angles, and means for reading a target value of energization level corresponding to an angle of rotation detected by the angle detector means from the memory means, the motor driver including means for summing a target value of energization level and an oscillation compensation together and supplying a current which is represented by the sum to the motor.

3. An energization control system according to claim 2, further including means for detecting a rotational speed of the rotor, said means for producing a target value including memory update means which updates the energization pattern stored in the memory means to one corresponding to the detected rotational speed.

4. An energization control system according to claim 3, further including a current map memory storing target values of energization level corresponding to rotational speeds and output torques of the rotor, said means for producing a target value reading a target value of energization level which corresponds to the detected rotational speed and the specified torque from the current map memory and forming an energization pattern, which is then written into the memory means.

5. An energization control system according to claim 4, further including a waveform map memory for storing a group of data which defines the configuration of an energization pattern for each pattern number and for each angle of rotation of the rotor, said current map memory containing a pattern number corresponding to the rotational speed and the torque of the rotor together with a target value of energization level, said means for producing a target value reading a target value of energization level and a pattern number which correspond to the detected rotational speed and the specified torque from the current map memory and also reading a group of data corresponding to the pattern number read out from the waveform map memory to form an energization pattern on the basis of the target value of energization level and the group of data, which energization pattern is then written into memory means.

6. An energization control system according to claim 2 in which the direction detector means detects a direction of rotation of the rotor from a change in bit signals from detected angle data delivered from the angle detector means.

7. An energization control system according to claim 3 in which said means for detecting the rotational speed detects a period with which a bit signal in the detected angle data delivered by the angle detector means changes and calculates a rotational speed in a manner corresponding to the detected period.

8. An energization control system electric motor comprising:

means for producing a target value of an energization level of an electric motor;

direction detector means for detecting a rotational direction of a rotor of the motor;

means for detecting a rotational speed of the rotor of the motor;

means for producing an oscillation compensation having a value which depends on whether a rotational direction of the rotor as indicated by the target coincides or not with an actual direction of rotation of the rotor, the oscillation compensation suppressing a reversal of the rotor relative to the target rotational direction when the actual rotational direction of the rotor does not coincide with the target rotational direction;

means for producing a speed compensation having a value which depends on a deviation of the rotational speed of the rotor with respect to a target rotational speed of the rotor; and a motor driver for energizing the motor with a current of a level which corresponds to the target value of the energization level, the oscillation compensation and the speed compensation.

9. An energization control system according to claim 8 in which the motor driver includes means for summing the target of energization level, the oscillation compensation and the speed compensation, the motor driver then energizing the motor with a current which corresponds to the sum.

10. An energization control system for an electric motor comprising:

means for producing a target value of an energization level of an electric motor;

direction detector means for detecting a rotational direction of a rotor of the motor;

means for producing an oscillation compensation having a value which depends on the coincidence or not between the rotational direction of the rotor indicated by the target and an actual rotational direction of the rotor indicated by the target and an actual rotational direction of the rotor;

a motor driver for energizing the motor with a current of a level which corresponds to the target value of the energization level and the oscillation compensation;

the means for producing a target value including means for detecting an angle of rotation of the rotor, memory means for storing an energization pattern having a group of target values of energization levels, each corresponding to an angle of rotation of the rotor within a given range of angles, and means for reading a target value of energization level corresponding to an angle of rotation detected by the angle detector means from the memory means; and the motor driver including means for summing a target value of energization level and an oscillation compensation together and supplying a current which is represented by the sum to the motor.

11. An energization control system according to claim 10, further including means for detecting a rotational speed of the rotor, said means for producing a target value including memory update means which updates the energization pattern stored in the memory means to one corresponding to the detected rotational speed.

12. An energization control system according to claim 11, further including a current map memory storing target values of energization level corresponding to rotational speeds and output torques of the rotor, said means for producing a target value reading a target value of energization level which corresponds to the detected rotational speed and the specified torque from the current map memory and forming an energization pattern, which is then written into the memory means.

13. An energization control system according to claim 12, further including a waveform map memory for storing a group of data which defines the configuration of an energization pattern for each pattern number and for each angle of rotation of the rotor, said current map memory containing a pattern number corresponding to the rotational speed and the torque of the rotor together with a target value of energization level, said means for producing a target value reading a target value of energization level and a pattern number which correspond to the detected rotational speed and the specified torque from the current map memory and also reading a group of data corresponding to the pattern number read out from the waveform map memory to form an energization pattern on the basis of the target value of energization level and the group of data, which energization pattern is then written into memory means.

14. An energization control system according to claim 10 in which the direction detector means detects a direction of rotation of the rotor from a change in bit signals from detected angle data delivered from the angle detector means.

15. An energization control system according to claim 11 in which said means for detecting the rotational speed detects a period with which a bit signal in the detected angle data delivered by the angle detector means changes and calculates a rotational speed in a manner corresponding to the detected period.

* * * * *